(12) United States Patent
Lewis et al.

(10) Patent No.: US 7,543,779 B1
(45) Date of Patent: Jun. 9, 2009

(54) LOW-IMPACT MATING SYSTEM

(75) Inventors: James L. Lewis, Houston, TX (US);
Monty B. Carroll, League City, TX (US); Thang D. Le, Friendswood, TX (US); Ray H. Morales, Houston, TX (US); Brandan R. Robertson, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 399 days.

(21) Appl. No.: 11/625,066

(22) Filed: Jan. 19, 2007

(51) Int. Cl.
*B64G 1/64* (2006.01)
(52) U.S. Cl. .................. 244/172.4; 244/159.4
(58) Field of Classification Search .......... 244/172.4–5, 244/158.1, 159.4; 248/573, 575
See application file for complete search history.

(56) References Cited

U.S. PATENT DOCUMENTS

| | | | |
|---|---|---|---|
| 1,610,540 A * | 12/1926 | Wickersham | 213/59 |
| 3,608,848 A | 9/1971 | Cantor et al. | |
| 4,177,964 A | 12/1979 | Hujsak et al. | |
| 4,588,150 A | 5/1986 | Bock et al. | |
| 4,809,936 A * | 3/1989 | Whitaker | 244/172.4 |
| 4,898,348 A | 2/1990 | Kahn | |
| 5,094,410 A | 3/1992 | Johnson | |
| 5,398,892 A | 3/1995 | Johnson | |
| 6,299,107 B1 | 10/2001 | Kong et al. | |
| 6,354,540 B1 * | 3/2002 | Lewis et al. | 244/172.4 |
| 7,172,385 B2 * | 2/2007 | Khajepour et al. | 414/735 |
| 2005/0263649 A1 * | 12/2005 | Ritter et al. | 244/172.4 |

* cited by examiner

*Primary Examiner*—Michael Carone
*Assistant Examiner*—Michael Kreiner
(74) *Attorney, Agent, or Firm*—Theodore U. Ro

(57) ABSTRACT

An androgynous mating system for mating two exoatmospheric space modules comprising a first mating assembly capable of mating with a second mating assembly; a second mating assembly structurally identical to said first mating assembly, said first mating assembly comprising; a load ring; a plurality of load cell subassemblies; a plurality of actuators; a base ring; a tunnel; a closed loop control system; one or more electromagnets; and one or more striker plates, wherein said one or more electomagnets on said second mating assembly are capable of mating with said one or more striker plates on said first mating assembly, and wherein said one or more striker plates is comprised of a plate of predetermined shape and a 5-DOF mechanism capable of maintaining predetermined contact requirements during said mating of said one or more electromagnets and said one or more striker plates.

23 Claims, 15 Drawing Sheets

LOW-IMPACT MATING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The subject apparatus and methods for use generally relate to an androgynous, reconfigurable, closed loop feedback controlled, low impact mating system and assembly with load sensing electromagnetic capture ring. More particularly, the apparatus relates to a load sensing, electromagnetic mating system. Still more particularly, the invention relates to a mating assembly and system having a reconfigurable control system that permits a load sensing ring with an electromagnetic capture mechanism to "softly" capture and mate two structures or vehicles together.

2. Additional Background

Mating systems permit two structures or vehicles to be coupled together. For instance, the assignee of the subject invention uses mating systems to mate one spacecraft to another in orbit around the Earth. The International Space Station (ISS) currently under construction in space has a mating system to permit the Space Transport System (STS), also referred to as the "Shuttle," to mate to the ISS. Crew, equipment, supplies, and other types of cargo then can be transferred from one vehicle to the other through the mating system tunnel.

Most mating systems use a mechanical structure comprising latches, hooks and other mechanisms. Generally, there are two different ways of mating vehicles together, either docking or berthing. "Docking" occurs when a free-flying vehicle, such as the Space Shuttle, under its own control maneuvers into the capture envelope and then into contact with the docking assembly of another vehicle, such as the Space Station. "Berthing" occurs when an externally attached device such as a Remote Manipulator System (RMS), which is structurally grounded to one vehicle such as the Space Station, attaches to the other vehicle and maneuvers into the capture envelope and then into contact with the Space Station mating assembly. Docking or berthing two vehicles requires that each vehicle have a mating assembly. To dock two vehicles using a conventional mechanical mating assembly, the vehicles must be pressed together with sufficient force to re-align the soft capture ring and to trip the mechanical soft capture latches, hooks, or etc. on the respective docking assemblies, thereby coupling the two docking assemblies. In a terrestrial application, this action is analogous to two train cars coupling. Train cars can be coupled only if one car is pushed against the other car with enough force to open and then close the mechanical coupling assembly.

The following discussion details the primary phases in any mating scenario. First is the "approach" phase wherein a vehicle moves into a capture envelope. A capture envelope is a predetermined area surrounding a mating assembly into which a pilot or remote control must guide a vehicle before docking/berthing can be effected. Second is the "aligment" phase wherein the two vehicles to be mated establish a soft capture ring alignment with one another. This phase has traditionally been accomplished by driving vehicles together to force capture ring alignment using passive guides during mating or by realigning using RMS visual cues to correct for misalignments. Third is the "capture" phase which is accomplished by forcing capture latches to hold the vehicles together or by "reach around and grab arms" to capture the mating interface during berthing. Fourth is the "attenuation" phase, wherein the dynamic energy and residual motion of the separate vehicles is absorbed by the combined assembly. Fifth is the "retraction" phase where residual misalignments are nullified and the mating mechanism is retracted to bring the mating sealing interfaces in contact. The final phase is the "structural mating" phase. There, structural latches are engaged to provide a rigid structural interface and to compress and pre-load the seals to facilitate the maintenance of a pressurized volume.

With prior mechanical mating assemblies, the action of forcing two vehicles together, particularly in space, can result in damage to one or both of the vehicles or sensitive systems and components due to the high forces required to actuate capture mechanisms when mating. Further, forcing the vehicles together can ruin vibration sensitive experiments, such as crystal growth experiments, that may be performed on one or both of the vehicles. There is a need for a mating system that can minimize or eliminate the potential for structural damage and vibration caused by conventional mating systems.

The assignee of the subject apparatus led the development of a first generation androgynous, reconfigurable, closed loop feedback controlled low impact docking system described in U.S. Pat. No. 6,354,540, issued on Mar. 12, 2002 to Lewis et al. The subject apparatus encompasses a second generation androgynous, reconfigurable, closed loop feedback controlled low impact docking system.

Despite the advantages a mating system would provide, to date no such mating system is known to exist (outside the subject apparatus and the apparatus described in U.S. Pat. No. 6,354,540) that provides low force mating or that can accomplish both docking and berthing operations.

SUMMARY OF THE INVENTION

The problems noted above are solved in large part by the androgynous, reconfigurable closed loop feedback controlled low impact mating system with load sensing electromagnetic capture ring described in U.S. Pat. No. 6,354,540. In one embodiment, the mating system comprises two fully androgynous mating assemblies. This allows two identical mating assemblies to dock or berth with one another in contrast to mating systems that use different (male and female) assemblies. Each mating assembly comprises a load sensing ring having an outer face, one or more electromagnets positioned on the outer face of the load sensing ring, and striker plates positioned on the outer face of the load sensing ring. Each mating assembly further comprises a plurality of load cells coupled to the load sensing ring, a plurality of actuator arms coupled to the load sensing ring capable of dynamically adjusting the position and orientation of the load sensing ring, and a reconfigurable closed loop control system capable of analyzing signals originating from the load cells and of outputting real time control for the actuator arms.

To a certain extent, the mating system of the subject apparatus and methods for use as well as what is described in U.S. Pat. No. 6,354,540 is somewhat analogous to the Russian-built Androgynous Peripheral Assembly System (APAS). The mating system disclosed herein differs, however, from the APAS in that the subject apparatus and methods for use is a "smart" electromechanical system comprised of a blend of structural/mechanical, electrical, computer controlled, and software elements. Further, "androgynous" as that term is used in the Russian APAS system means that only parts of the assembly interfaces are androgynous, whereas the subject apparatus and methods for use is fully androgynous. Being fully androgynous allows an active mating assembly to mate with another active docking assembly; two active APAS systems cannot mate.

In addition, the design of the subject apparatus and methods for use as well as what is described in U.S. Pat. No. 6,354,540 varies from the traditional mating mechanism of a highly mechanically interconnected system of gears, clutches, and linkages. The subject apparatus and methods for use comprises a reconfigurable computer controlled mechanism and uses a smart electromechanical, six (6) degrees of freedom (6-DOF) platform that incorporates an active load sensing system to automatically and dynamically adjust the soft capture ring during capture, instead of requiring significant force to push and realign the ring. Instead of mechanical trip latches that require a tripping force for capture, the subject apparatus and methods for use uses electromagnets to achieve "soft" capture, but are not limited to solely the use of electromagnets. Further, the subject apparatus and methods for use also can be controlled as a damper in lieu of the interconnected linear actuators and the separate load attenuation system associated with conventional docking systems, which are used to attenuate the residual motion and dissipate the forces resulting from ramming two vehicles together.

Moreover, the mating assembly of the subject apparatus and methods for use as well as what is described in U.S. Pat. No. 6,354,540 does not require minimum or maximum closing velocities or dynamic forces for correcting misalignments and effective capture. In fact, the mating system of the subject apparatus and methods for use can handle large positive closing velocities and forces, as well as negative and zero closing velocities Further, the reconfigurable closed loop control system is adjustable to match a specific vehicle's properties i.e. mass and center of mass or gravity offset and operational mating characteristics, i.e., approach velocities and angular rates. The control system parameters are tunable in each axis to various stiffness and damping constants depending upon stiffness, capture, and mass handling response requirements. This results in a large range of vehicle applicability and mating capabilities.

In addition to the components of the apparatus described in U.S. Pat. No. 6,354,540, several novel components have been developed and incorporated in new multiple combinations. The subject apparatus and methods for use encompass these novel components and new multiple combinations.

BRIEF DESCRIPTION OF THE DRAWINGS

For a detailed description of the present apparatus and its method of use, reference will now be made to the accompanying drawings in which.

DETAILED DESCRIPTION

The present apparatus and method for use will now be described more fully hereinafter with reference to the accompanying drawings, in which embodiments of the apparatus are shown. This apparatus may, however, be embodied in many different forms and should not be construed as limited to the embodiments set forth herein; rather, these embodiments are provided so that this disclosure will be thorough and complete and will fully convey the scope of the method to those skilled in the art. Like numbers refer to like elements throughout.

For the purposes herein, a "space module" is equivalent to any object, article, item, structure, vehicle, or the like which is used, operated, controlled, or the like in exoatmospheric space. For the purposes herein, "DOF" is equivalent to "degrees of freedom." For purposes herein, a "load subassembly" and a "load cell subassembly" are synonymous. For purposes herein, a "Z-direction" and a "normal direction" are synonymous.

1. First Generation Low Impact Mating System

Figure 1A:
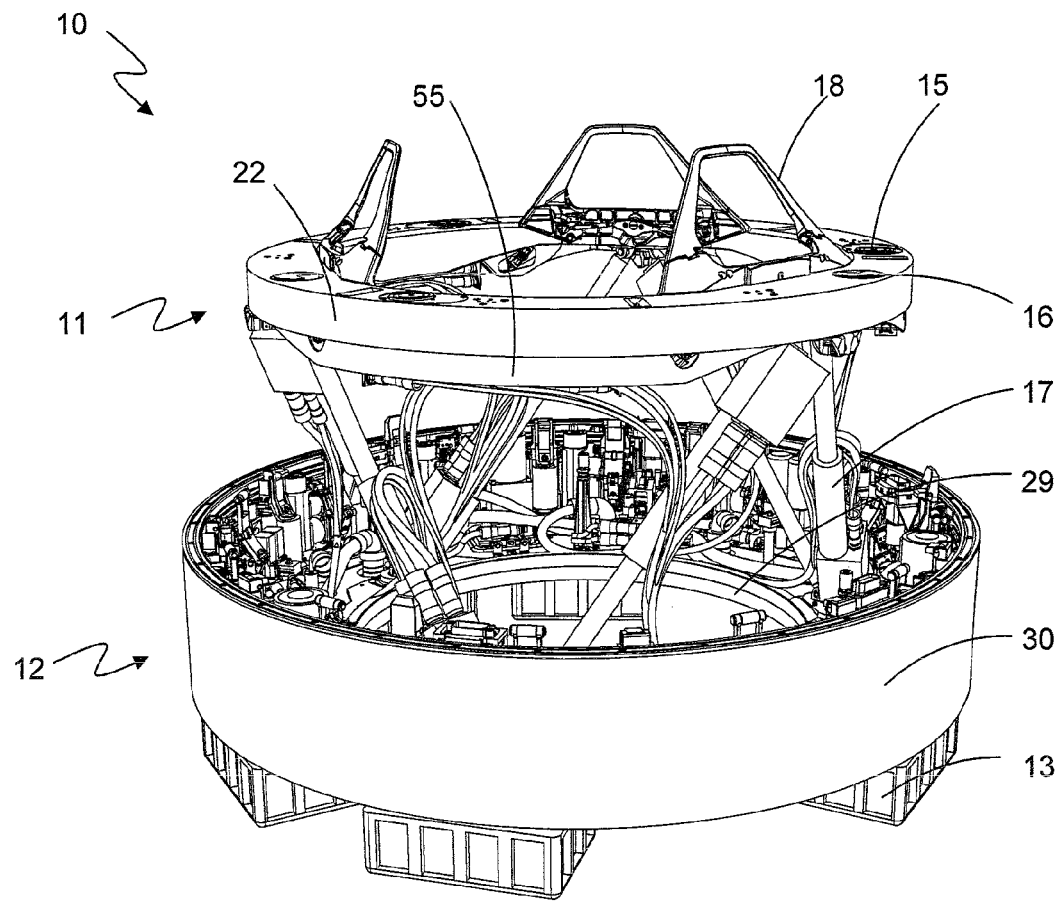
FIG. 1A is a perspective view of an embodiment of the mating assembly in an extended position.

Referring to the drawings, particularly FIG. 1A there is shown an embodiment of a low impact mating assembly 10 similar to what is described in U.S. Pat. No. 6,354,540. U.S. Pat. No. 6,354,540 is incorporated by reference herein. The mating assembly 10 comprises a 6-DOF platform 11, a tunnel 12, and a control subsystem 13.

Figure 1B:
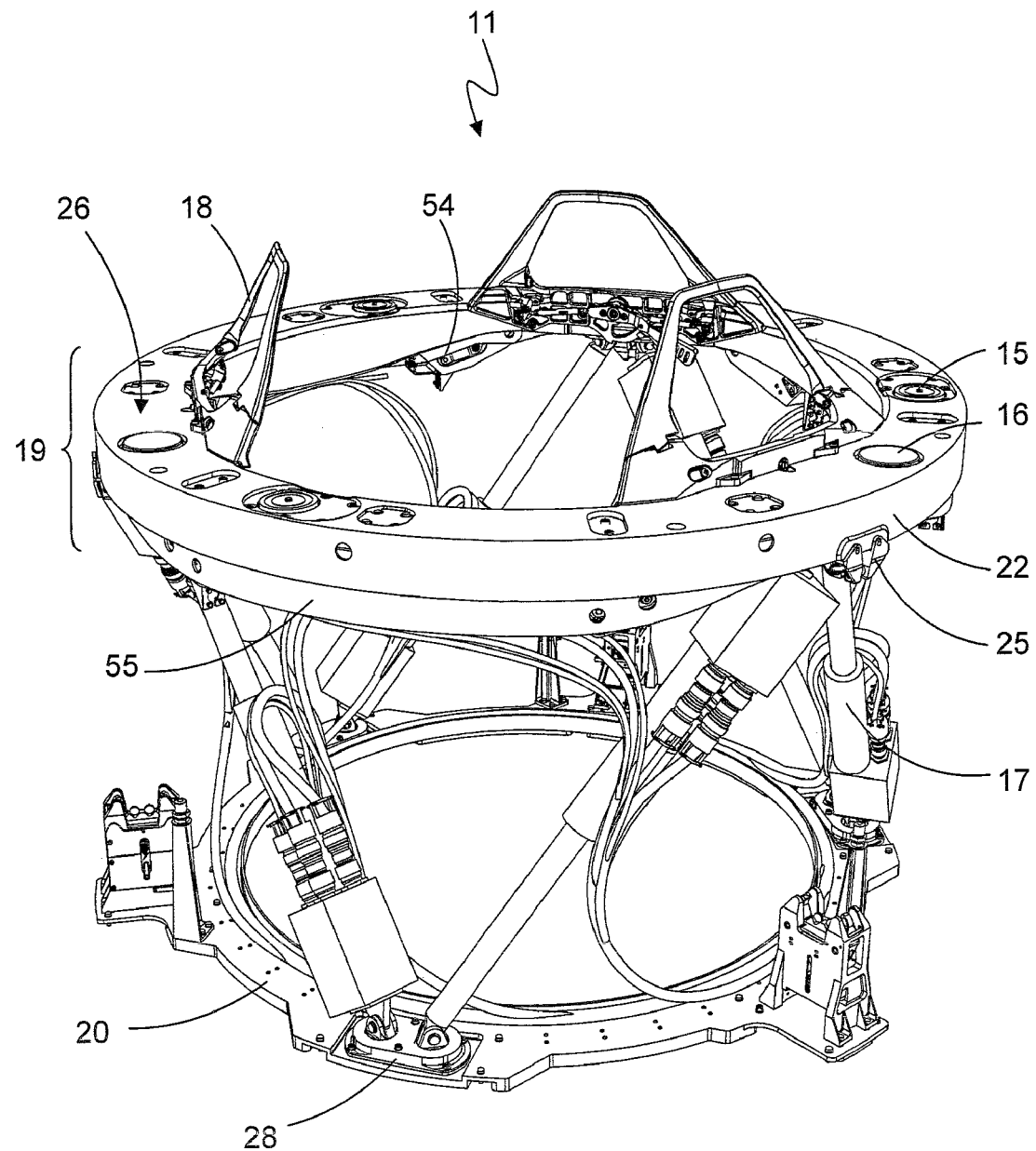
FIG. 1B is a perspective view of an embodiment of the 6-DOF platform in an extended position.
Figure 2A:
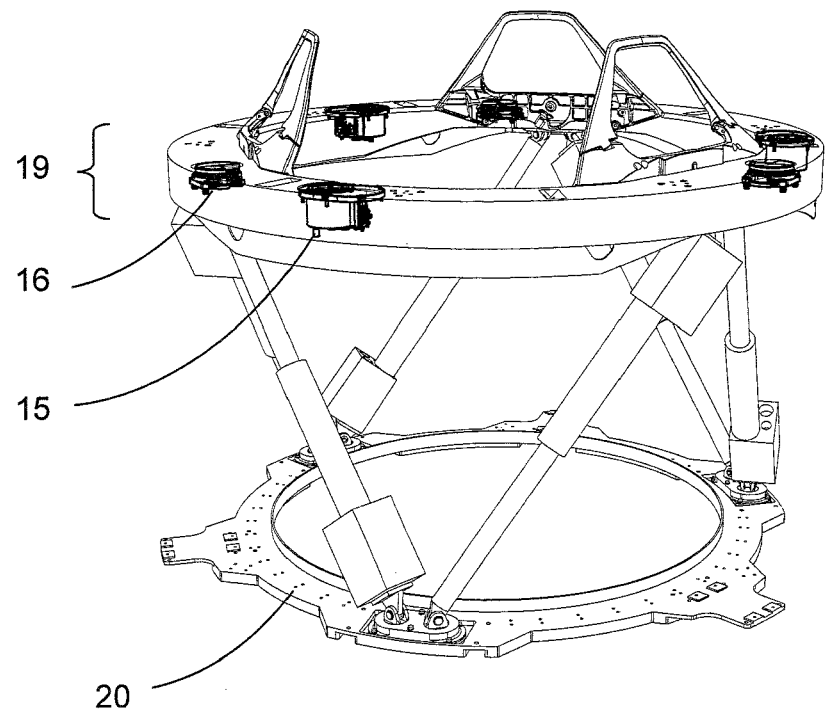
FIG. 2A is a perspective view of an embodiment of the 6-DOF platform in an extended position with an emphasis on the plurality of electromagnets and striker plates.

With continued reference to the embodiment in FIG. 1A and reference to FIGS. 1B and 2A, the 6-DOF platform 11 comprises a load sensing ring sub-assembly, one or more electromagnets 15, one or more striker plates 16, a plurality of actuators 17, and a plurality of alignment guides 18. Structurally, the load sensing ring sub-assembly is comprised of a load ring 19 and a base ring 20. As stated supra, the 6-DOF platform 11 incorporates an active load sensing system to automatically and dynamically adjust the load ring 19 during capture, instead of requiring significant force to push and realign the load ring 19. In addition to the load ring structure 22, the load ring 19 is comprised of a plurality of load cells 23 (see FIGS. 3B and 3C) and one or more striker bars 25 (see FIG. 1B. The load ring 19 has an annular outer face 26 and an inner face 27. The one or more electromagnets 15 and one or more striker plates 16 are preferably positioned on the outer face 26 of the load ring 19. The load ring 19 and base ring 20 are coupled together using the plurality of actuators 17, base connection points ($BC_i$), and upper connection points ($UC_i$). In an embodiment, the plurality of actuators 17 comprises six actuators for extension, retraction, and 6-DOF motion of the 6-DOF platform 11. The plurality of actuators 17 dynamically and physically adjusts the position and orientation of the load ring 19 through six degrees of freedom.

With continued reference to FIG. 1A, the tunnel 12 is comprised of a tunnel bottom ring 29 and a tunnel channel 30. The tunnel 12 is a pressurized transfer area through which persons, materials, etc. can pass from one mated vehicle to the other. The tunnel 12 is coupled to the base ring 20.

Figure 3A:
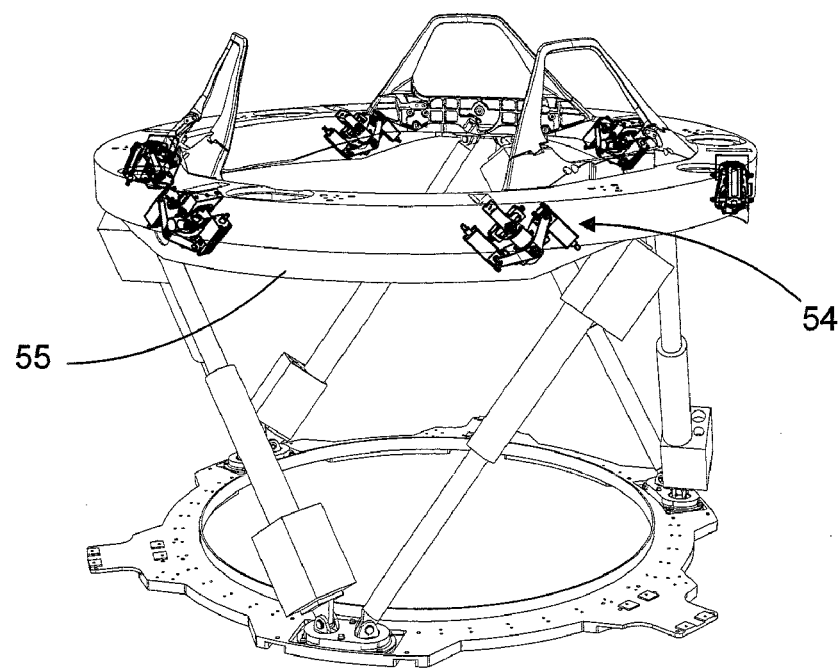
FIG. 3A is a perspective view of an embodiment of the 6-DOF platform in an extended position with an emphasis on the plurality of load cell sub-assemblies.
Figure 3B:
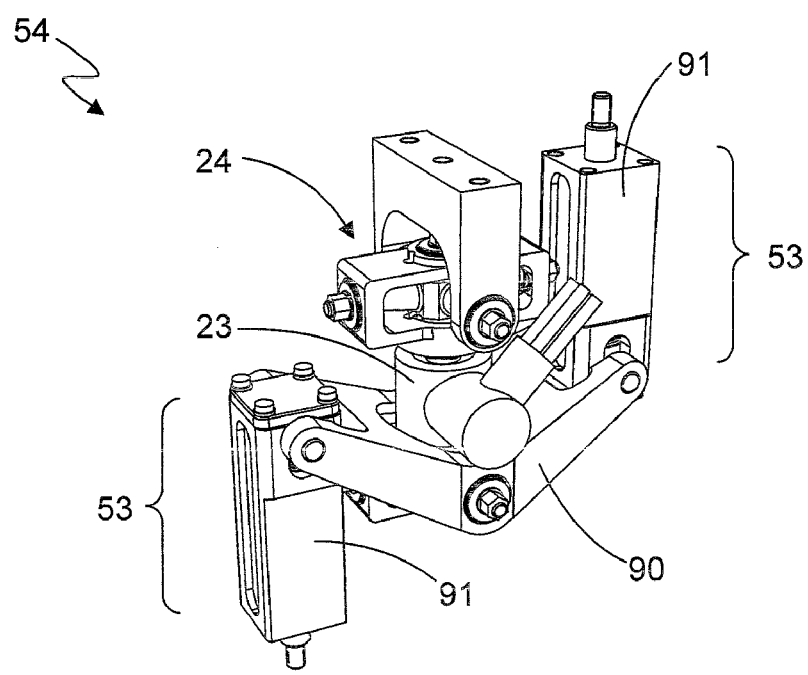
FIG. 3B is a perspective view of an embodiment of a load cell sub-assembly.

With continued reference to FIG. 1A as well as reference to FIG. 3B, the closed loop control subsystem 13 is electronically connected to the plurality of load cell subassemblies and receives signals from at least one and preferably all of the plurality of load cells 23. These signals correspond to, or are representative of, the forces sensed by each of the plurality of load cells 23. The control subsystem 13 is capable of analyzing the signals orginating from a load cell 23 and generating real-time control signals wherein the plurality of actuators 17 move the load ring through six degrees of freedom. Stated differently, the control subsystem 13 processes these force signals and commands the plurality of actuators 17, thereby managing the actuators to counteract, absorb, attenuate, or any combination each sensed force. In general, the control subsystem 13 continuously monitors the sensed forces by the plurality of load cells 23 and directs each of the plurality of actuators 17 to adjust its length to a calculated length (calculated by the control subsystem), to counteract, absorb, attenuate, or any combination the sensed forces.

Figure 11D:
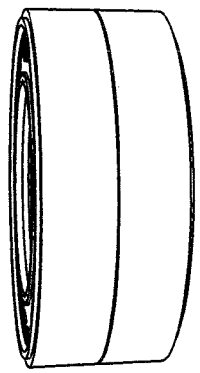
FIG. 11D illustrates a first and second mating assembly in a structural mating phase.
Figure 11C:
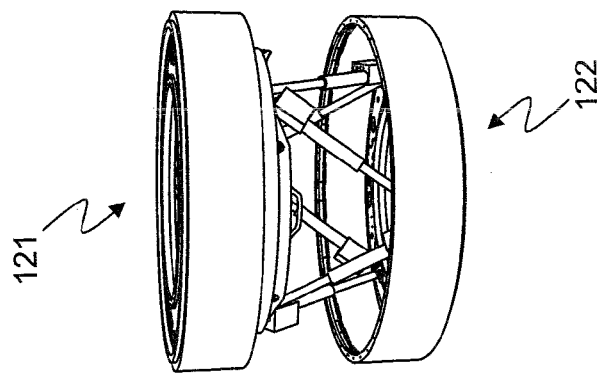
FIG. 11C illustrates a first and second mating assembly in a capture phase.
Figure 11B:
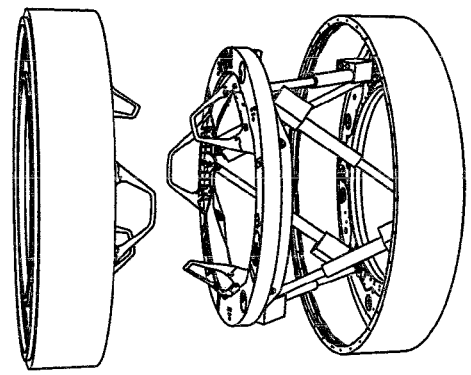
FIG. 11B illustrates a first and second mating assembly in an approach phase.
Figure 11A:
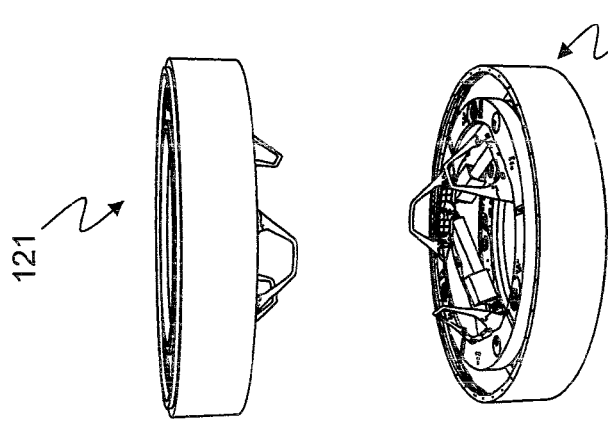
FIG. 11A illustrates a first and second mating assembly in a proximal distance to each other.

With particular reference to FIG. 11A and as generally described in U.S. Pat. No. 6,354,540, one or more electromagnets 15 are used to softly capture a second mating assembly 121 by a first mating assembly 122. In operation, during the capture mode, electrical current is passed to energize the one or more electromagnets 15 for soft capture. After entering the capture envelope and beginning with initial contact, the plurality of alignment guides 18 on the active (second) 31 and passive (first) 32 mating assemblies, discussed in more detail infra, dynamically guide the load ring 19 on the first mating assembly 32 into alignment with the second mating assembly 31. In addition, the one or more electromagnets 15 positioned on the outer face of the load ring on the second mating assembly 31 are delivered to corresponding one or more striker plates 16 positioned on the outer face of the load ring on the first mating assembly 32 of the other vehicle. In a preferred embodiment, when all electromagnets 15 and all striker plates 16 of the respective mating assemblies contact, all contact switches (ref: element 18 in U.S. Pat. No. 6,354,540) are triggered and a signal is provided to the control subsystem 13 to change the operational mode of the second mating assembly 121 of the mating vehicle from a capture mode to an attenuation mode.

As described in U.S. Pat. No. 6,354,540, each vehicle being mated has a mating assembly. Also, when docking or berthing, a second mating assembly is "active" while the first mating assembly is "passive." The second or active mating assembly automatically provides misalignment compliance and attenuation to accomplish docking or berthing. The first or passive mating assembly acts as a fixed assembly. "Fixed" is intended to mean herein that the second mating assembly can be either a mating assembly which is incapable of dynamically adjusting or a mating assembly, which although capable of dynamically adjusting, is made temporarily incapable of dynamically adjusting.

2. Second Generation Low Impact Mating System 2.1 Alignment Guides

A guide system is comprised of a plurality of inwards pointing alignment guides (also referred to as a "guide petal") 18 equally spaced around the load ring 19 to provide alignment for capture when meshing with the guide system of another mating assembly. In a preferred embodiment, the number of alignment guides 18 is three (3). In an embodiment, each alignment guide 18 is outwards foldable to clear a predetermined diameter sized through-passage as needed. In another embodiment, all joints/connections associated with the alignment guides 18 have no free play (no sloppiness) and the alignment guides have sufficient stiffness for accurate load sensing. In still another embodiment, the alignment guides 18 comprise a quick release latch for rapid and convenient configuration change to and from stowage configuration. In yet another embodiment, all folding operations are manual, require no tools, and meet predetermined force limitations. In an embodiment, the alignment guides 18 comprise a positive lock to "rigidize" the alignment guides in the ready-to-dock configuration to ensure guide system's performance during mating. The shape and size of the alignment guides are predetermined based on system requirements. Example system requirements include the following: to maintain system androgyny, to be in accordance with the 6-DOF Platform's capability, and to meet or exceed the system's capture envelope requirements.

2.2 Electromagnet

Figure 2B:
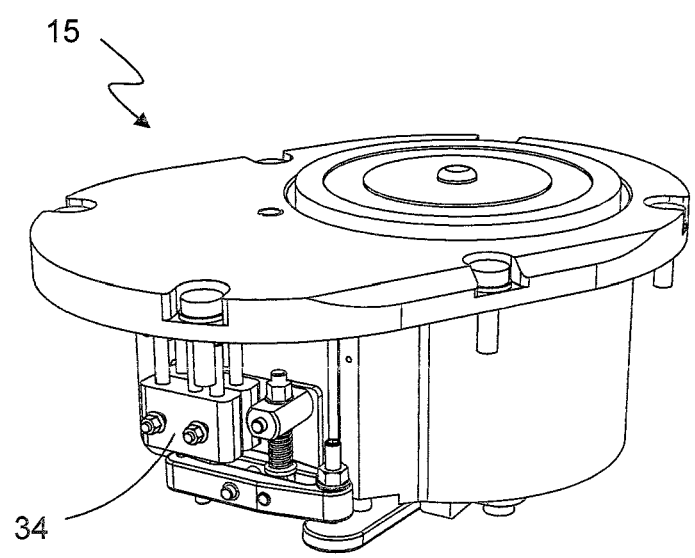
FIG. 2B is a perspective view of an embodiment of an electromagnet with an emphasis on the electromagnet limit switch.
Figure 2C:
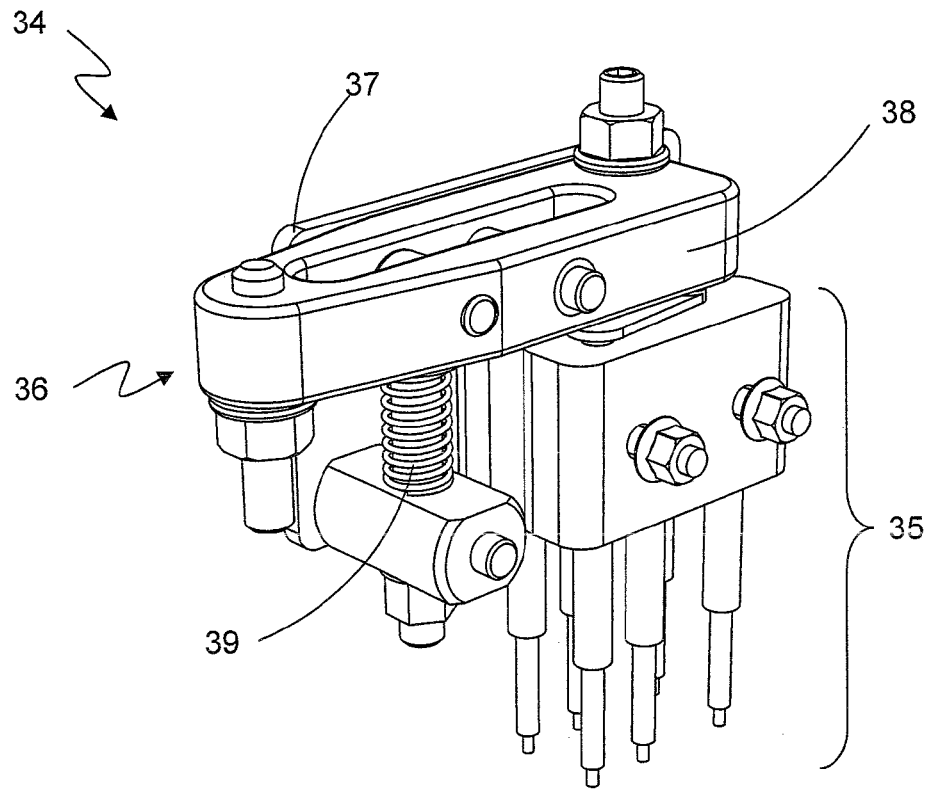
FIG. 2C is a perspective view of an embodiment of an electromagnet limit switch.

With reference to FIGS. 2A, 2B, and 2C, in addition to what is described supra, the one or more electromagnets 15 are further comprised of one or more electromagnet limit switches 34 incorporated in each one or more electromagnets 15. FIG. 2A illustrates the location of the electromagnets 15 in reference to the load ring 19. FIG. 2B indicates one or more electromagnet limit switches 34 as a means for providing the necessary feedback that contact has been made between the operational one or more electromagnets on an active mating assembly and the one or more striker plates on the passive mating assembly. Also with particular reference to FIG. 2B, the one or more electromagnet limit switches 34 are incorporated in the one or more electromagnets 15 for efficient packaging considerations and functionally, to ensure the electromagnet limit switches 34 are in close proximity to where the contact will occur. The one or more electromagnet limit switches 34 can measure striker plate contact "on" and striker plate contact "off." From an operational perspective, in the situation wherein there is a plurality of electromagnets and strikers plates, proper alignment and coupling of these pluralities of electromagnets and striker plates is a concern. In a nominal operational embodiment or method of use, the one or more electromagnets 15 are energized after all of the one or more electromagnet limit switches 34 have provided feedback that contact has occurred between all electromagnet(s) and striker plate(s). Alternatively, consider the instance where there are two or more electromagnets and striker plates. Further, if proper contact was made between one of the electromagnets and striker plates, but not the other, and the electromagnets were energized, then the proper contact of one electromagnet and striker plate may constrain and bind the entire mating assembly such that proper contact with the other electromagnet and striker plate could not be made. Therefore, from a system perspective, the one or more electromagnet limit switches 34 serve to ensure proper contact of all electromagnets and striker plates before the electromagnet(s) is/are energized.

With particular reference to FIG. 2C, in an embodiment, an electromagnet limit switch 34 is comprised of an assembly of one or more mechanical-type electrical micro-limit switches 35 and a protective mechanism 36. In an embodiment, a mechanical-type electrical micro limit switch 35 (hereinafter referred to as a micro-switch) is a fragile instrument. Thus, the micro-switch 35 should be adequately protected to ensure an operational status and maximize its operational use. Further, in an embodiment, a micro-switch 35 has a limited operational range. A protective mechanism 36 is a means for protecting a micro-switch 35 from harsh environmental factors and unnecessary mechanical contacts. In an embodiment, a protective mechanism is comprised of a protective housing 37 coupled to the electrical micro limit switch 35, a pivot arm 38 coupled to the protective housing 37 wherein the pivot arm 38 translates large motion to small motion and provides the small motion for micro limit actuation, and a spring 39 coupled to the pivot arm 38 and protective housing 37 wherein the spring 39 returns the pivot arm 38 to the original position once the contact force is removed and maintains the micro limit switch 35 in a nominal position. An electromagnet limit switch 34 is a means for electromechanically detecting limit positions of a mating assembly component. In a second embodiment, two micro limit switch 35 are incorporated in each one or more electromagnet 15 for redundancy. In a third embodiment, the micro-switch 35 is a gold, hermetically sealed, bifurcated contact, micro-switch wherein said micro-switch 35 meets or exceeds environmental requirements. In a fourth embodiment, the protective mechanism 36 is a means for isolating a micro-switch from excessive displacement and forces. In a fifth embodiment, the protective mechanism 36 has a single point of mechanical input and independent adjustments of point of activation for the one or more micro-switches.

2.3 Striker Plate

Figure 2D:
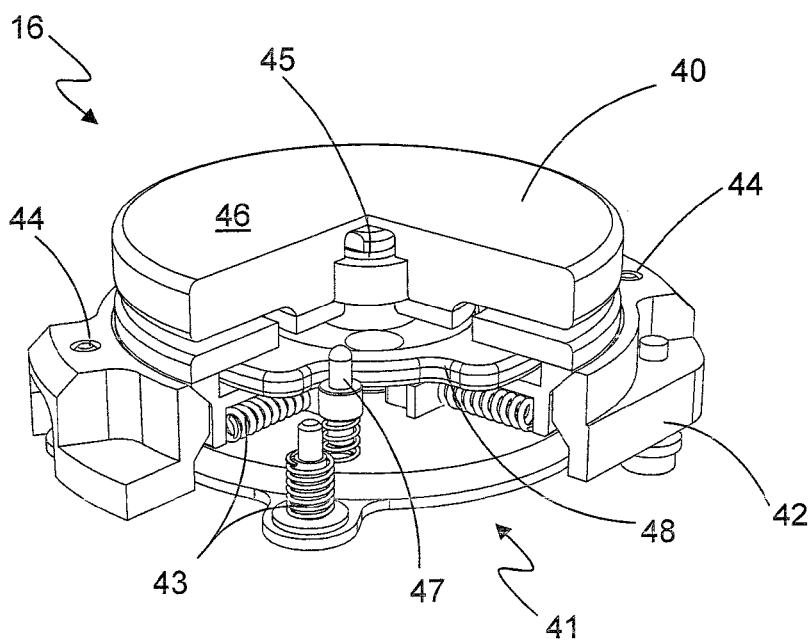
FIG. 2D is a perspective view of an embodiment of a striker plate.

With continued reference to FIG. 2A and particular reference to FIG. 2D, the one more striker plates 16 is a means for providing the one or more electromagnets 15 an interface for soft-capturing an active mating assembly to a passive mating assembly. In an embodiment, the one or more striker plates 16 are circular and formed of a ferrous material. Multiple shapes for a striker plate and electromagnet exist. For example, a striker plate or electromagnet may be rectangular, oval, or asymmetric. In a second embodiment, the size of the one or more striker plates is slightly larger in diameter as compared to the associated one or more electromagnets. In a third embodiment, the striker plate material selection and design is predetermined in conjunction with the electromagnet to maximize the electromagnetic force between the two. In a fourth embodiment, the one or more striker plates are comprised of a plate 40 mounted to a 5-degree of freedom (5-DOF) compliant mechanism 41. Operationally, the 5-DOF mechanism 41 provides a means for compliance requirements during the capture phase between an electromagnet and striker plate. The 5-DOF mechanism 41 provides a means for allowing striker plate motion in all directions, except a pure normal or Z-direction (e.g., only a "pull" in the Z-direction will separate the electromagnet and striker plate). The 5-DOF mechanism 41 also provides a means for "relaxed" and flexible contacting between an electromagnet and striker plate. This "relaxed" or flexible contact provides a means to increase the probability that fill contact is made with all electromagnet and striker plates (i.e., all contact points). Stated differently, without the 5-DOF mechanism 41, misalignment could make it difficult to obtain the requisite full contact with all contact points. Further, the 5-DOF mechanism 41 can reduce the tolerance of a contact thereby allowing flexibility to capture the other contact points. In a fifth embodiment, the 5-DOF mechanism 41 is represented by 3 rotational and 2 translational (X & Y) degrees of freedom. In a sixth embodiment, the 5-DOF mechanism 41 is comprised of a structural support 42, a plurality of restoring springs 43 are coupled to the structural support wherein the restoring springs 43 restores the striker plate 16 to a predetermined neutral position, a plurality of spring plungers 47 coupled to the structural support and to at least one of the plurality of restoring springs 43 wherein the spring plungers contact the plate 40 thereby working in concert with the restoring springs to restore the striker plate to a predetermined neutral position, a slider plate 48 coupled to a predetermined subset of the plurality of restoring springs wherein the slider plate 48 works in concert with the predetermined subset of the plurality of restoring springs in translational motion and position, a pivot joint 45 coupled to the structural support 42 wherein the pivot joint allows rotational motion of the striker plate, and a plate 40 coupled to the pivot joint 45 wherein the plate 40 represents the component that physically contacts an electromagnet 15 during mating. In a seventh embodiment, the one or more striker plates are restored to a neutral position and attitude when not mated to another mating assembly. In a eighth embodiment, the one or more striker plates have a Z-direction stroke 44 that provides a means for allowing the assembly to be elevated above the adjacent magnets in the passive or locked down modes and retracted below the adjacent magnets during soft-capture in the active mode. This Z-direction stroke 44 is a means for providing a sixth degree of freedom that is extendable and retractable. The Z-direction stroke 44 allows three-point planar contact. The problem is somewhat analogous to the condition in which trying to get all legs of a three-leg table to contact a surface simultaneously is easier to achieve than with a table with more than three legs.

The Z-direction stroke 44 is also interrelated with the hardstop structural column(s) 60, discussed in more detail infra. Mechanically, the Z-direction stroke 44 is analogous to a "pop-up" feature. Operationally, a hardstop structural column 60 will push up or "pop-up" a corresponding Z-direction stroke 44 on a passive mating assembly such the one or more electromagnets on the passive assembly will not contact the one or more striker plates on the active assembly. In a ninth embodiment, the one or more striker plates 16 have a pivot joint 45 located substantially at the center of rotation of each plate 40 and substantially adjacent to each plate's outer surface. Functionally, wherein the striker plate has a plurality of degrees of freedom, it is advantageous to have a pivot joint 45 as close to the center of rotation of the plate 40 for ease of compliance and balanced moments. Further, it is advantageous to have a pivot joint 45 as close to the plate's 40 outer surface as possible, as opposed to buried in the striker plate, which could result in partial contact. In a tenth embodiment, a striker plate coating 46 on the surface of the striker plate is applied to protect the striker plate material from environmental effects.

In an embodiment as illustrated in FIG. 2A, the one or more striker plates 16 are comprised of three striker plates mounted 120 degrees apart and slightly elevated on the outer face of the load ring. And, the one or more electromagnets are comprised of three electromagnets 15. During operation in the capture phase, the three electromagnets on the active mating assembly engage the three striker plates on the passive mating assembly when the plurality of alignment guide petals 18 overlap on each mating assembly. Each striker plate operates independent of each other. Functionally, the three striker plates 16 are passive during normal operation with provisions for compliance to prevent hard interference and binding between alignment guide geometry and striker plates on another mating assembly. The three striker plates 16 are mounted to a corresponding 5-DOF compliant mechanism 41 (see FIG. 2D) for attachment to the load ring 19. During operations, when in the passive lockdown mode, the three striker plates 16 are driven into a hard stop position slightly elevating all three passive striker plates 16 above the stowed position. The implementation of this design feature provides that only three electromagnets and striker plates can engage, eliminating the difficulties in requiring more than 3 pairs of electromagnets and striker plates to engage during soft-capture and increasing the operational life of the electromagnets and striker plates not in use.

2.4 Load Joint

In an embodiment a plurality of load joints 24 utilize a universal joint arrangement. The universal joints transmit only axial forces while minimizing the effects of free-play and fiction to allow the load cells to be properly positioned for maximum sensitivity.

Figure 3C:
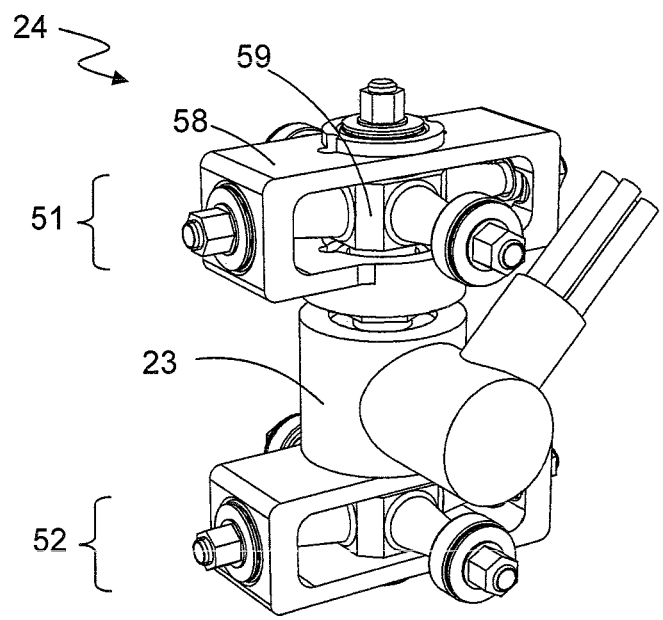
FIG. 3C is a perspective view of an embodiment of a load cell and two load joints.

With reference to FIGS. 3A, 3B, and 3C, in a first embodiment, the plurality of load joints 24 provides a total of 5-DOF on both ends of an uni-axial, bi-directional load cell 23. A load cell subassembly 54 is comprised of at least one load joint 24 and at least one load cell 23. Each load cell 23 is capable of sensing forces imposed on the load ring structure 22 by contact with an external mating assembly and generating electronic signals representative of the sensed forces. In the situation wherein the plurality of load cells 23 is uni-axial and bi-directional, extraneous torque moments and shear forces are not desired. Therefore, in a preferred embodiment, extraneous torque moments and shear forces should be eliminated at the load cell 23. Hence, the plurality of load joints 24 is a means for minimizing extraneous torque moments and shear forces at the point of the plurality of load cells 23.

Further, there is a need to achieve a statically determinate system for load sensing and load computations. Thus, the plurality of load joints 24 is also a means to avoid an over constrained system. In a second embodiment, the plurality of load cells 23 are comprised of a predetermined sensing end 51 and a predetermined ground end 52 wherein at least one or a plurality of load joints 24 provide 3 rotational degrees of freedom at the sensing end 51 and 2 rotational degrees of freedom at the ground end 52. In a third embodiment, the plurality of load joints 24 shall have no freeplay movement, thereby maximizing accurate force reading. In a fourth embodiment, the load joints 24 are sufficiently stiff to achieve accurate force readings by the plurality of load cells 23. In a fifth embodiment, the plurality of load joints 24 has minimal friction to achieve accurate load reading by the plurality of load cells 23. In a sixth embodiment, the rotational range of each load joint for each direction is about +/−15 degrees since full motions are not required. This range is determined by the worst case of an overload protection assembly's 53 movement wherein the overload protection assembly 53 is described in more detail infra. In a seventh embodiment, the plurality of load joints 24 allows load cell replacement as needed. In an eighth embodiment, the load joint's sensing end 51 is coupled to outer surface of the load ring. The load joint's ground end 52 is coupled to the overload protection assembly 53, which is coupled to a lower ring 55 of the load ring 19. In a ninth embodiment, the load joint 24 is comprised of a structural housing 58, and a multi-axes orthogonal pivot 59 coupled to the structural housing wherein the multi-axes pivot allows for only axial force into the load cell 23.

2.5 Actuator Joint

Figure 4A:
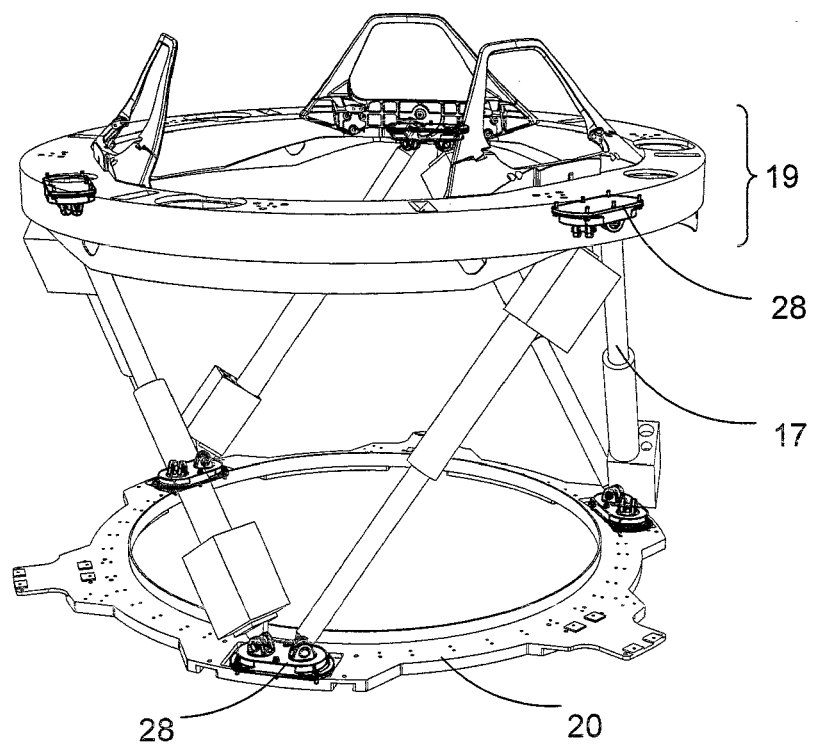
FIG. 4A is a perspective view of an embodiment of the 6-DOF platform in an extended position with an emphasis on the plurality of actuator joints.
Figure 4B:
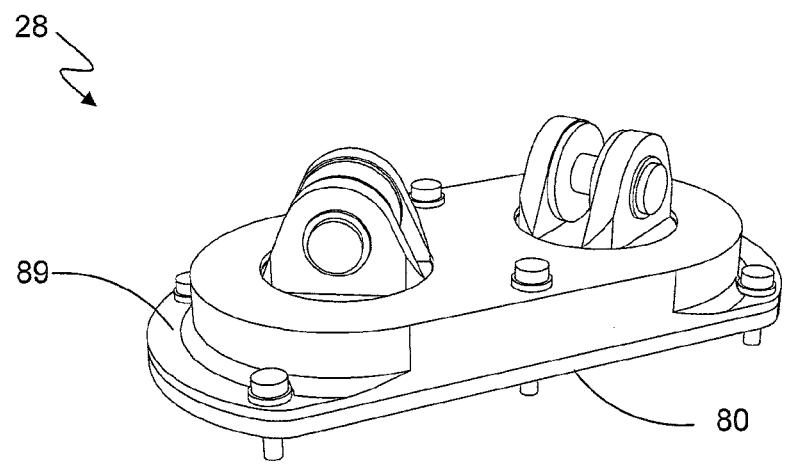
FIG. 4B is perspective view of an embodiment of an actuator joint.
Figure 4C:
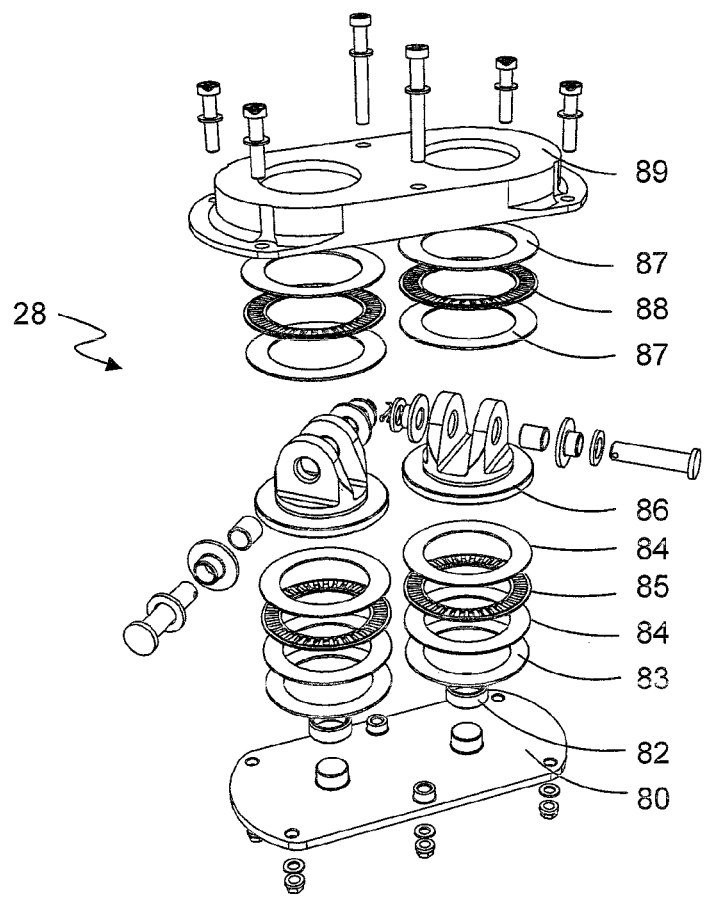
FIG. 4C is an exploded view of an embodiment of an actuator joint.

With reference to FIGS. 4A, 4B, and 4C, one or more of the plurality of actuators 17 is mounted to two actuator joints 28. In an embodiment, an actuator joint 28 is located at each end of one or more of the plurality of actuators 17 wherein the actuator joint 28 is a means for providing predetermined kinematical connections internal to the 6-DOF platform 11 in such a way that the entire platform has six degrees of freedom capability when the one or more of the plurality of actuators 17 are actuated. With particular reference to FIG. 4A, actuator joints 28 are mounted to both the load ring 19 and base ring 20 of the load sensing ring sub-assembly, thereby providing a means for a structural link between an actuator 17 and the load ring 19 as well as an actuator 17 and the base ring 20. Each actuator joint 28 also provides a means for efficient retracting and extending the one or more of the plurality of actuators 17 for efficiencies in volume of a mating assembly 10. The actuator joints 28 are also a means for providing a compact actuator pivot point that can efficiently transfer loads such that competing loads are balanced. For example, an external force and friction are two competing loads that should be balanced for efficient operation. The one or more actuator joints 28 are also a means to transfer side loads and not bind up movement of an actuator.

In a first embodiment, the actuator joints 28 have a motion range that accommodates all configurations of the plurality of actuators 17. In a second embodiment, the actuator joints 28 are optimized for maximum motion range of the 6-DOF platform 11 with minimal platform volume that accommodates crew passage clearance. In a third embodiment, frictional load is minimized for ease of operation of actuators. In a fourth embodiment, an actuator joint 28 is comprised of a mounting support base panel 80, a plurality of bushings 82 coupled to the mounting support base panel 80, a plurality of shims 83 coupled to the mounting support base panel 80, a plurality of first bearing raceways 84 coupled to the plurality of shims 83, a plurality of the first bearings 85 sandwiching the plurality of first bearing raceways 84, a plurality of devises 86 coupled to the plurality of first bearing raceways 84 and the mounting support base panel 80, a plurality of second bearings 88 coupled to the plurality of devises 86, a plurality of second bearings 88 sandwiching a predetermined two of a plurality of second bearing raceways 87, and an actuator joint housing 89 mounted to the mounting support base panel 80.

2.6 Hardstop Structural Columns

Figure 5A:
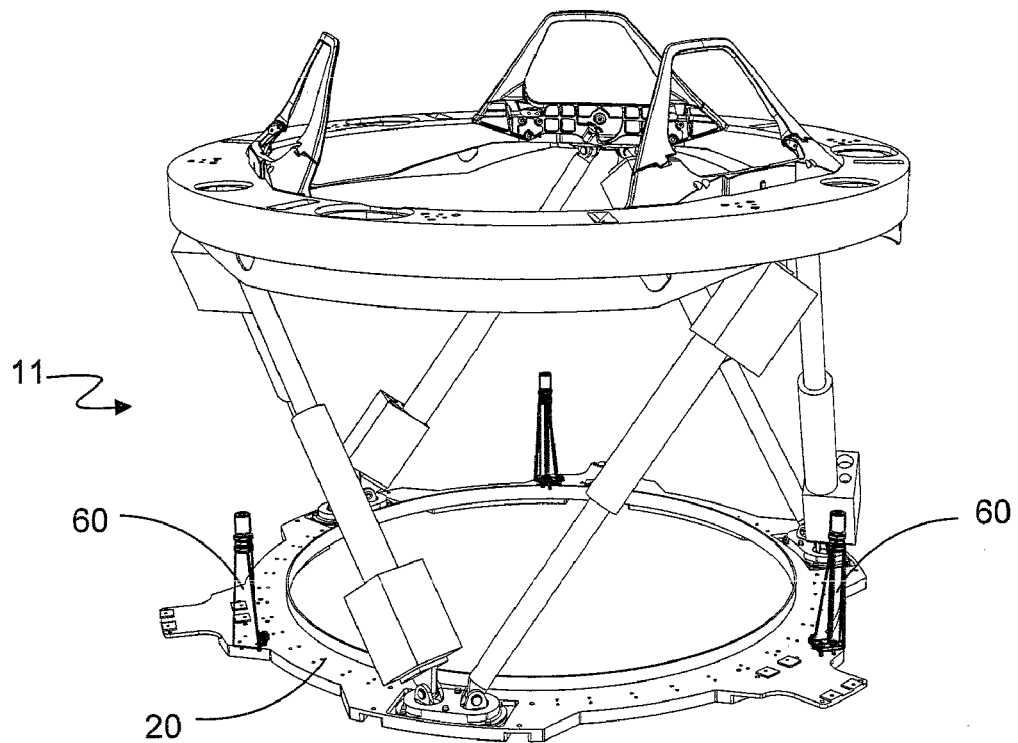
FIG. 5A is a perspective view of an embodiment of the 6-DOF platform in an extended position with an emphasis on the plurality of hardstop columns.
Figure 5B:
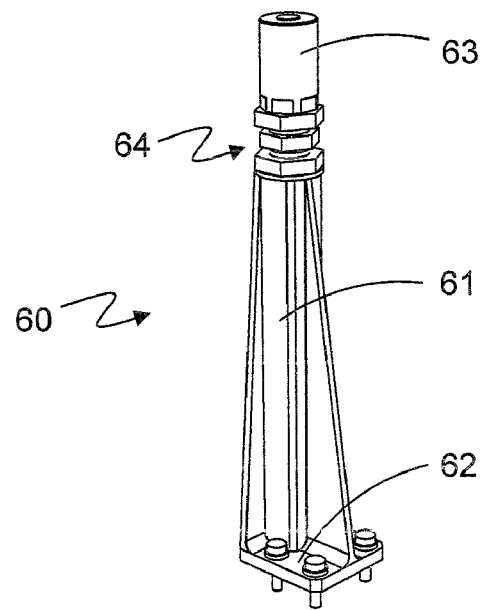
FIG. 5B is a perspective view of an embodiment of a hardstop column.

Now referring to FIGS. 5A and 5B, the 6-DOF platform 11 is further comprised of a plurality of hardstop structural columns 60. The plurality of hardstop structural columns 60 provides structural contact with the bottom of the 6-DOF platform striker plates 16 thereby allowing the striker plates' surface to be raised above (or "popped up" as described supra) their stow level when the 6-DOF platform 11 is locked down in the stow configuration or locked down in a passive configuration. Thus, the plurality of hardstop structural columns 60 provide a means for preventing unwanted contact between one or more electromagnets 15 on a passive mating assembly and one or more striker plates 16 on an active mating assembly.

Figure 6A:
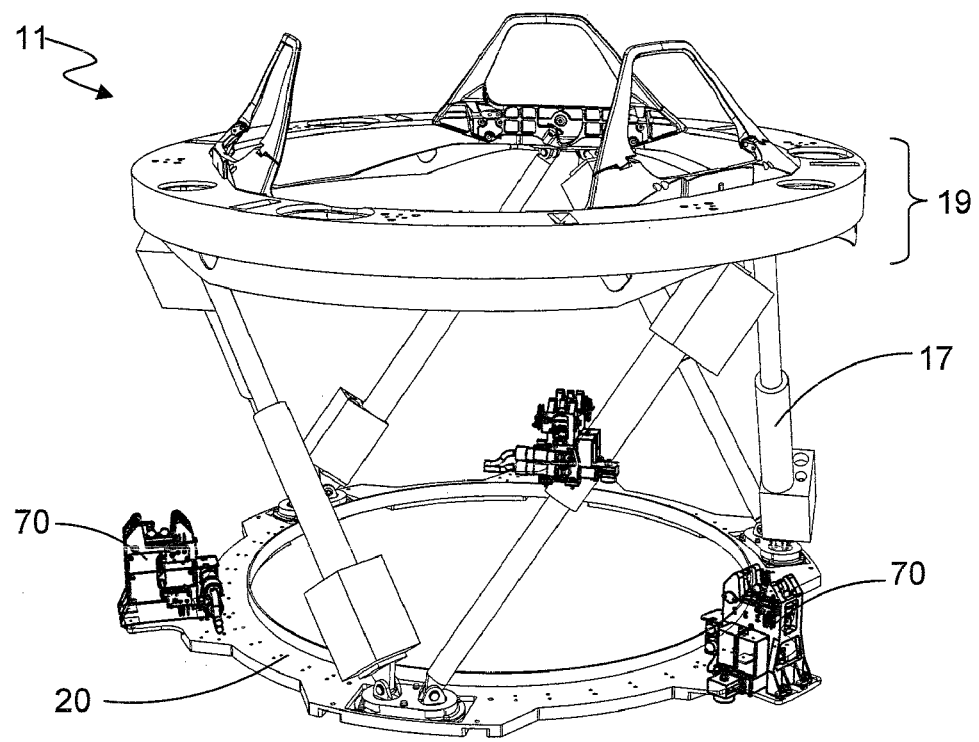
FIG. 6A is a perspective view of an embodiment of the 6-DOF platform in an extended position with an emphasis on the plurality of lockdown assemblies.

In a first embodiment, the plurality of hardstop structural columns 60 is coupled to the base ring 20 and has sufficient stiffness for the operation of the plurality of actuators 17 and a lockdown assembly 70 (see FIG. 6A). With particular emphasis on FIG. 5B, in a second embodiment, a hardstop structural column 60 is comprised of a structural column 61, a hardstop mounting plate 62 formed to one end of the structural column 61 wherein the hardstop mounting plate 62 is coupled to the base ring 20, a hardstop contact 63 coupled to the structural column at the second end of the structural column 61, and a load limiting device 64 coupled in between the hardstop contact and the structural column. Multiple embodiments exist for the structural column shape. For example, in an embodiment, the structural columns are cylindrical in shape. In another embodiment, the structural columns have a rectangular cross section. The hardstop structural column 60 is formed of a rigid material.

2.7 Lockdown Assembly

Figure 6B:
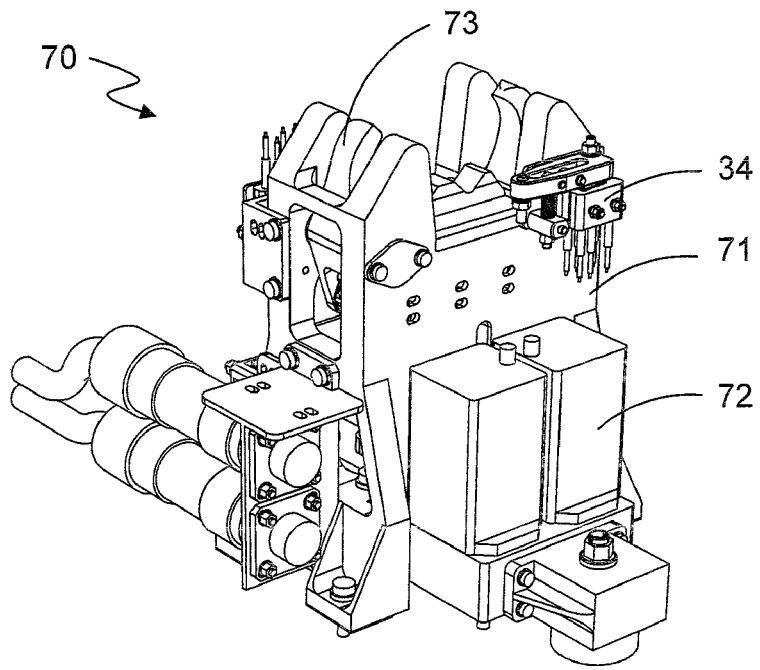
FIG. 6B is a perspective view of an embodiment of a lockdown assembly.
Figure 6C:
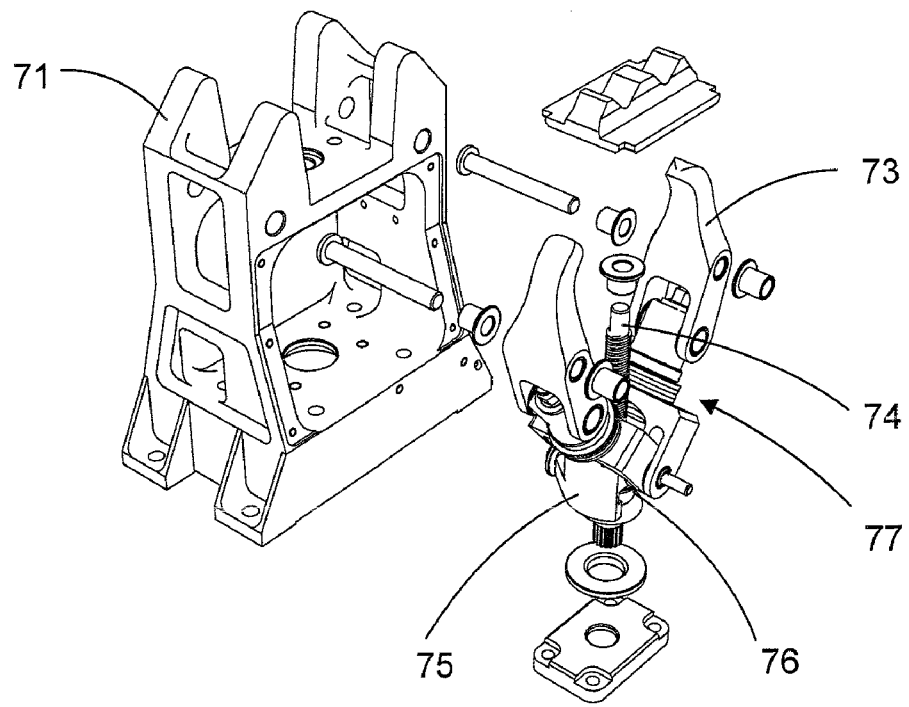
FIG. 6C is a partially exploded view of an embodiment of a lockdown assembly.

With continued reference to FIGS. 6A, 6B, and 6C, the 6-DOF platform 11 is further comprised of a plurality of lockdown assemblies 70 coupled to the base ring 20.

The lockdown assembly 70 is a means for providing capture and retention of the load ring 19 in a passive mode and for launch load environment protection. In other words, the lockdown assembly 70 is used to rigidly embrace (or "rigidize") the load ring 19 of the 6-DOF platform 11 during a non-operational mode (i.e., during the launch phase of a vehicle) and during passive or "fixed" modes. In an example scenario, in the absence of a lockdown assembly 70, an overload could result or the entire 6-DOF platform 11 would be free to move subjecting the load cells 23 to harsh vibration and thereby damaging the load cells 23. The lockdown assembly 70 also provides a means for embracing the load ring 19 thereby creating an alternative load path relative to the plurality of load cells and actuators such that loads are absorbed through the lockdown assembly 70. Operationally, the lockdown assembly 70 decreases the wear and tear of the plurality of load cells 23 and increases the load cells and actuators' operational life. The lockdown assembly 70 protects the plurality of load cells 23, "rigidizes" the plurality of actuators 17, and "rigidizes" the load ring 19 in a passive mode.

In a first embodiment, a lockdown assembly 70 is comprised of a lockdown assembly housing 71, one or more lockdown actuators 72 coupled to the lockdown assembly housing 71, a plurality of capture arms 73 coupled to the lockdown assembly housing, a jack-screw 74 electromechanically driven by the one or more lockdown actuators 72 and coupled to the plurality of capture arms 73, a spring stack 77 coupled to the capture arms 73 wherein the spring stack 77 provides a uniform load to the plurality of capture arms 73, a nut 75 coupled to the jack-screw wherein the nut 75 travels along the jack-screw 74 to articulate the capture arms 73, the slider 76 is a structural interface built into the nut 75 to aid in providing the uniform load to the plurality of capture arms 73, and one or more limit switches 34 electromechanically coupled to the lockdown assembly housing 71. The plurality of lockdown actuators 72 provides a means for engaging and disengaging the load ring 19 and provides a means for electromechanical actuation of the lockdown capture arms 73. In second embodiment, the lockdown assembly 70 provides a means for over-center mechanical retention of the load sensing ring sub-assembly. In operation, the one or more striker bars 25 of the load ring 19 are seized and retained by the lockdown capture arms 73. The one or more limit switches 34 provide electronic indication in both the locked and unlocked positions for verification of position of the lockdown assembly 70. In a third embodiment, the lockdown assembly 70 provides restraints in all three translational and three rotational directions via three units at three locations equally spaced around the base ring of the 6-DOF platform 11. In a fourth embodiment, for redundancy purposes, a total of two motors with one additional manual drive are required per actuator unit. The motors may be 28VDC at 1 Amp brush-typed electric motors in the form of a torque-summed arrangement. In a fifth embodiment, the manual drive is to be accessed from the pressurized side. In a sixth embodiment, the one or more limit switch 34 is provided at each lockdown assembly location for electronic indication for verification of the load ring position for "ready to lockdown" status. In a seventh embodiment, the lockdown assembly 70 is mounted on the base ring 20 of the 6-DOF Platform 11. In an eighth embodiment, the lockdown assembly 70 provides lock-down preload in the locked position.

2.8 Overload Protection Assembly

With reference to FIG. 3B, in addition to what is illustrated in FIG. 3A, the load cell subassembly 54 is comprised of one or more overload protection assemblies 53. The one or more overload protection assemblies 53 are provided to isolate the load cells 23 from axial load inputs that exceed operational and load cell load limits. The plurality of load cells 23 has a predetermined operational range. If greater sensitivity (i.e., small loads) is required, a load cell 23 may have a more limited operational range. If a sensitive load cell 23 is used, at some point, the loads can be greater than the sensing capability. Without an overload protection capability, a load cell can be exposed to excessive loads that could damage the load cell. The overload protection assembly 53 provides a relative motion between the two rings to create an alternative path elsewhere such that excessive loads are not exposed to the plurality of load cells 23. Further, the one or more overload protection assemblies 53 provide a motion to create a secondary load path for both compression and tension inside the load ring 19 when a high impact force is exerted on the load sensing ring sub-assembly. In an embodiment, the one or more overload protection assemblies comprises a structural arm 90, a plurality of overload limiters 91 coupled to the structural arm 90 wherein the overload limiters provides overload protection for a load cell. Functionally, the overload limiters 91 transfer a high impact load to another path. In this example, the overload limiter 91 is a spring limiting device. Further, in an embodiment, an overload limiter 91 doesn't affect the nominal operational range of a load cell 23. In another embodiment, the overload protection assemblies incorporate stacks of spring washers (e.g., Bellville washers) (not otherwise shown) at each end of the plurality of load cells 23 so when the design load limit is reached the spring washer stack compresses thereby diverting the load path away from the plurality of load cells 23 and into an alternate load path and into a structural hard stop, wherein the primary load path is through the plurality of load cells 23. While in a passive lock-down mode, the load ring 19 is held rigid and the primary load path is continually diverted from the plurality of load cells 23 to the plurality of lockdown assemblies 70. This rigidization prevents the plurality of load cells 23 from being exposed to static or transient loads, which could damage sensitive equipment (e.g., strain gauges) inside a load cell 23. In a first embodiment, the overload protection assemblies 53 provide a range of operations of about + or −125 lbf of load limit protection. In a second embodiment, the arrangement of the overload protection assemblies 53 on the load ring also provides geometric conformance for the lockdown assembly. In a third embodiment, the overload protection assemblies 53 preload in both directions (compression and tension) to provide a rigid structure during normal operations to achieve accurate load reading. In a fourth embodiment, the preload amount is close to, but does not exceed, the plurality of load cells' full-scale capabilities. In a fifth embodiment, the one or more overload protection assemblies 53 primary load path mechanism are mounted between the ground end 52 of the plurality of load cells and the lower ring 55. Further, in a sixth embodiment, a secondary load path mechanism is mounted between the load ring structure 22 and the lower ring 55. In a seventh embodiment, during load sensing, the secondary load path is completely disconnected.

2.9 Tunnel

Figure 7A:
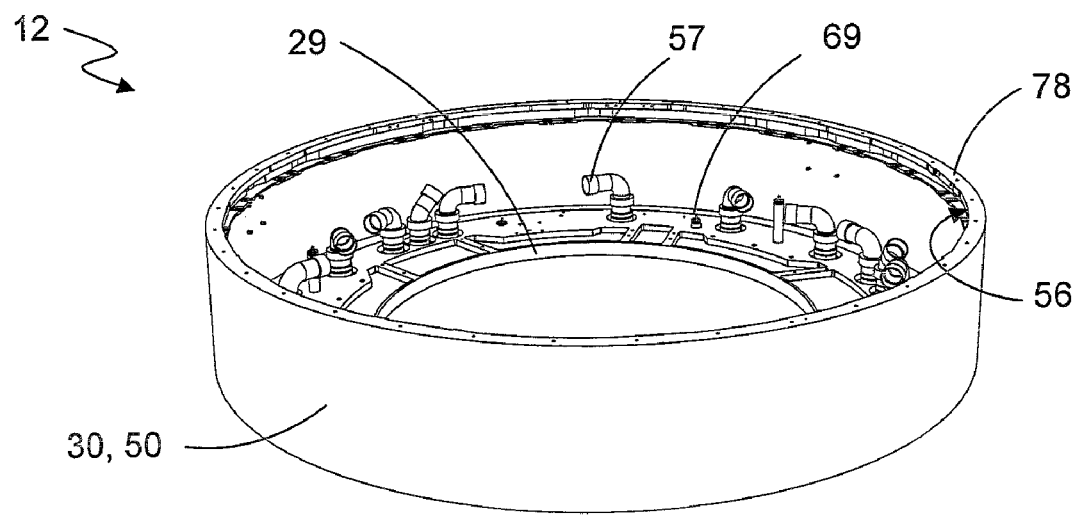
FIG. 7A is a perspective view of an embodiment of the tunnel.

With reference to FIG. 7A, the tunnel 12 provides a pressurized area through which persons, equipment, supplies, and other types of cargo may transfer from one mated vehicle to another. In an embodiment, the tunnel 12 attaches directly to a bolt and seal interface flange on the host vehicle (not otherwise shown) and provides the primary load path for all loads and the structure necessary for mounting predetermined mating assembly subsystems, wherein the host vehicle is defined as the vehicle to which a mating assembly is coupled to. In an embodiment, the tunnel 12 is comprised of an inward facing tunnel channel 30 and a bottom ring 29. As used herein, the use of "ring" is not intended to limit the cross-sectional shape to a circular cross-section. Multiple embodiments relative to the tunnel channel 30 and bottom ring's 29 cross-sectional shape exist. In the embodiment illustrated in FIG. 7A, the channel may be cylindrical in shape and the bottom ring may be circular in cross-section. In an embodiment, the tunnel channel is a conduit wherein the bottom ring substantially matches the channel's cross-sectional shape at a predetermined one end of the channel. In another embodiment, the tunnel channel 30 is the pressure vessel and the supporting member for the structural latch assembly 95 (see FIG. 8) components and is comprised of a dynamic mating seal flange. In still another embodiment, tunnel channel 30 is further comprised of a bottom flange (not otherwise shown) wherein the bottom ring 29 is attached and sealed to the bottom flange of the tunnel channel 30. In addition, the bottom ring 29 is further comprised of multiple penetrations 49 for mounting ancillary components such as, for example, power and data umbilicals, pass-thru connectors 57, and manual input drive shafts (not otherwise shown). In still a further embodiment, the tunnel 12 is coupled to the host vehicle by a circumferentially arranged, equally spaced fasteners (not otherwise shown) compressing redundant O-rings seals (not otherwise shown).

In an embodiment, the tunnel construction may be from a seamless Roll Ring Forging. Multiple embodiments for the material used to construct the tunnel exist. For example, a rigid material such as 6061-T651 may be used since it provides excellent corrosion resistant steel (CRES) properties, as a potential baseline material selection. In another example, if material strength is insufficient, other roll ring forging material choices can include 2219 for moderately higher strength, 7075-T73 or 7050. In an embodiment, the forging annular material thickness is estimated at about 4-6 inches, which is a limit for right angle machining and some roll ring forgings. In an embodiment, all subsystems or components of the present apparatus are attached to the bottom ring 29 using fasteners in locking inserts.

In a first embodiment, the tunnel 12 is comprised of an integrally machined structural element 50 wherein said structural element 50 is a means for providing a structural enclosed volume for pressurization with minimal potential leak paths during nominal operations. In a second embodiment, the tunnel 12 is further comprised of a structural flange 56 wherein the structural flange 56 is a means for providing sealing and latching capabilities as well as mounting to host vehicle interfaces. In a third embodiment, the tunnel 12 is further comprised of one or more interfaces. In a fifth embodiment, the one or more interfaces are selected from a group consisting of dynamic seals 78 (seal-on-seal) for tunnel to tunnel sealing; static seals for tunnel to vehicle sealing; mounting provision for the bottom ring 29; mounting provision for the mechanical umbilical and final guidance interfaces; mounting provision for latch assembly; mounting provision for electronics boxes and cable routing tie downs; mounting provision for separation push-off assembly; provision for thermal protection system for re-entry heating and egress touch surface protection; mounting provision for ground support equipment handling fixtures; or any combination. In a sixth embodiment, the tunnel 12 is further comprised of one or more pass-through connectors 57 coupled to the bottom ring 29. In a seventh embodiment, the one or more pass-through connectors are MIL-C-38999 Series III type connectors since these connectors can be specified to SSQ-21635. In an eighth embodiment, the one or more pass-through connectors are hermetic connectors. In a ninth embodiment, the tunnel 12 is further comprised of one or more pass-through connectors 57 coupled to the bottom ring 29 wherein the pass-through connectors provide means for connecting shielding material to the pass-through connector body. In a tenth embodiment, the one or more pass-through connectors 57 are comprised of a backshell wherein the backshell provides a means for connecting shielding material to the pass-through connector body.

The interfaces mentioned supra are discussed in more detail herein. In a first embodiment, the static seals are coupled to the tunnel at the host vehicle's bolt and seal interface flange. As examples, static seals are used at the interface of: channel to adapter to host vehicle; channel to bottom ring; pass-through connectors to bottom ring; hatch frame (of host vehicle) to bottom ring. In a second embodiment, a dynamic seal (not otherwise shown) is provided on the tunnel upper flange interface between mating vehicles. As examples, dynamic seals are used at the interface of: tunnel seal-on-seal; mechanical pass-thru shafts; hatch latch pass thru; hatch frame to hatch door. In a third embodiment, an International Space Station Gasko-type seal is the mating interface seal since it provides ease of installation and verification as compared to traditional o-ring seals. Multiple embodiments of seals exist. For example, development of a broader seal cross-section for use in a seal-on-seal application has been started showing great promise in meeting leak rate requirements.

2.10 Pass-Thru Auxiliary Drive

Figure 7B:
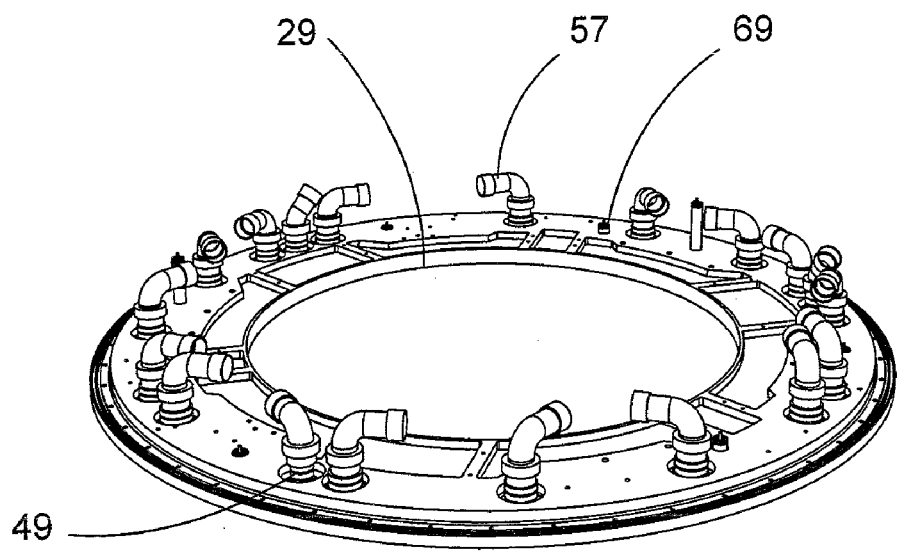
FIG. 7B is a perspective view of an embodiment of the tunnel bottom ring.
Figure 7C:
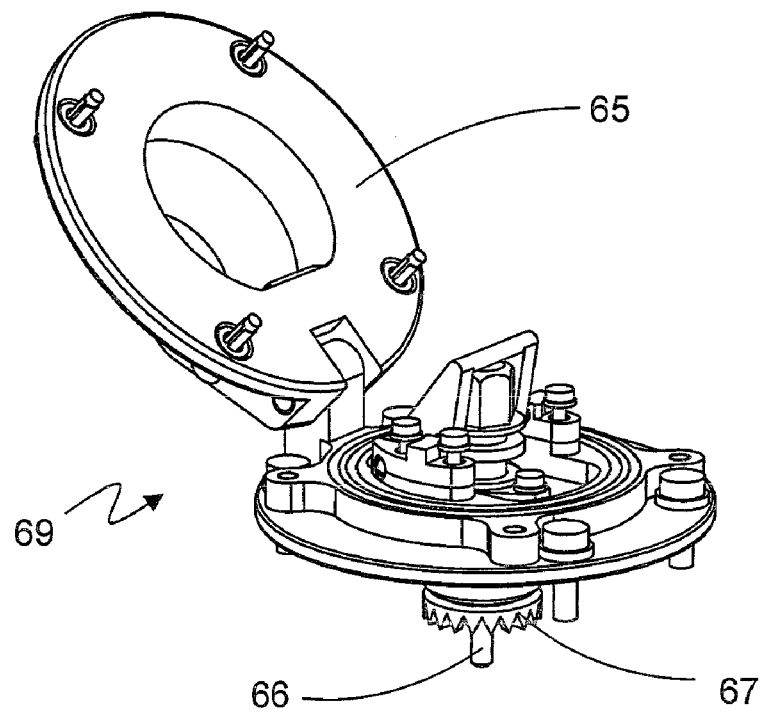
FIG. 7C is a perspective view of an embodiment of a pass-thru auxiliary drive.

With particular reference to FIGS. 7B and 7C, a pass-through auxiliary drive 69 represents a means for providing manual mechanical actuation for all actuators equipped with an auxiliary input. In an embodiment, actuators equipped with an auxiliary input are mounted on the vacuum side of a mating assembly 10. The pass-thru auxiliary drive 69 is a means for allowing actuation of an actuator from the pressurized side of a mating assembly 10. In an embodiment, the pass-thru drive shaft 66 and its geartrain 67 are disengaged from the actuator auxiliary input gear to minimize drag load on the actuator at all times and only to be engaged for manual actuation. In an embodiment, the pass-thru auxiliary drive 69 has standard intra-vehicular activity tool interfaces and has dynamic and static seals to prevent leakage. In another embodiment, the pass-thru auxiliary drive has a removable cap 65 with o-ring seals to prevent leakage during non-operational modes.

2.11 Structural Latch Assembly

Figure 8:
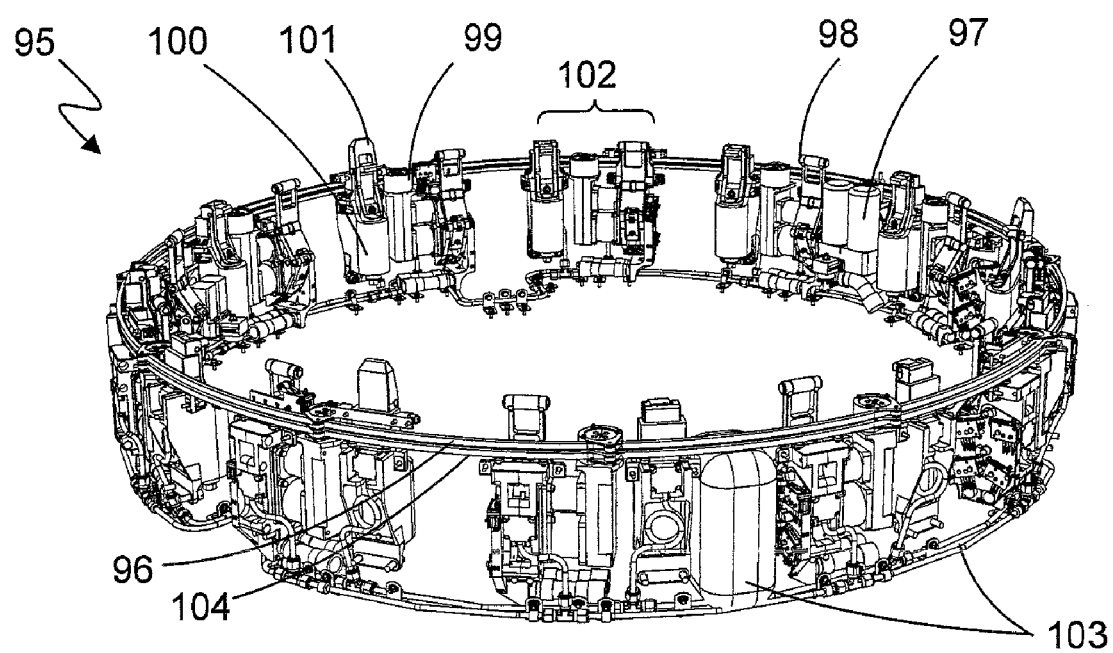
FIG. 8 is a perspective view of an embodiment of a structural latch assembly.

With particular reference to FIG. 8, there is illustrated an embodiment of a structural latch assembly 95. The structural latch assembly 95 provides the final load reactive connection between mated vehicles. The structural latch assembly 95 provides a structural attachment between mated vehicles forming an interface between the mated vehicles. In a first embodiment, the structural latch assembly 95 is able to provide the final retraction of a predetermined distance between the two mating halves of the mated vehicles such that the 6-DOF platform 11 does not have to provide significant loads in a low-efficiency orientation. In other words, the 6-DOF platform 11 brings the two assemblies together to a predetermined distance (for example, 0.5 inches). At this distance, mating operation is handed off from the 6-DOF platform 11 to the structural latch assembly 95 for final structural attachment. In a second embodiment, the structural latch assembly 95 allows for nominal unlatching in a predetermined amount of time (for example, twenty (20) seconds or less) so that a mating vehicle's expedited departure capability is not compromised. In a third embodiment, the structural latch assembly 95 provides an emergency separation option as a secondary (backup) system to be used in emergencies. In a fourth embodiment, the structural latch assembly 95 is at least single fault tolerant during both structural mating and separation phases. The emergency separation option discussed supra is not considered a backup in this application. In a fifth embodiment, the structural latch assembly 95 is at least two fault tolerant for credible catastrophic failures while mated and at least single fault tolerant for credible critical failures while mated. In a sixth embodiment, the structural latch assembly 95 does not preclude androgynous mating capability so that maximum versatility is maintained in the system.

In a first embodiment, the structural latch assembly 95 is comprised of a first ring gear 96; a second ring gear 104, a plurality of latch actuators 97 mechanically attached to the first ring gear 96, the second ring gear 104, or both; a plurality of linkages 98 mechanically attached to the first ring gear 96, the second ring gear 104, or both; and a plurality of gearheads 99 mechanically attached to the plurality of linkages 98. In a second embodiment, the structural latch assembly 95 is further comprised of a plurality of tabs 100; and a plurality of guide pins 101 attached to at least three tabs. Operationally, a plurality of linkages of a structural latch assembly of a first mating assembly will mechanically latch on to a plurality of tabs of a structural latch assembly of a second mating assembly. The guide pins of each or both structural latch assemblies will guide the linkages of the first mating assembly and the tabs of the second mating assembly to a predetermined latching position. In a third embodiment, the structural latch assembly 95 is attached to the tunnel 30 and more specifically, mounted internal to and below the upper structural tunnel mating interface seal (pressure vessel) flange. In a fourth embodiment, a latch subassembly 102 is comprised of a tab 100, a linkage 98, and a gearhead 99. In a fifth embodiment, the plurality of latch subassemblies 102 is equally spaced in a radial manner relative to the tunnel 30. In a sixth embodiment, there are twelve latch subassemblies. In a seventh embodiment, the plurality of latch subassemblies does not yield at a predetermined limit load or lower than the limit load thereby allowing repeated operation. In a fifth embodiment, each latch subassembly is comprised of a plurality of primary linkages in a multiple-bar arrangement which when articulated, the plurality of primary linkages can reach across, grab, and retract a plurality of latch tabs which are coupled on the opposing mating assembly thereby compressing and preloading the mating interface seal flanges to each other. In a sixth embodiment, each primary linkage is coupled to a separate linkage housing, wherein the linkage housing is coupled to the first ring gear via a gearhead.

In an embodiment, during primary latching nominal operations, each structural latch subassembly 102 is driven synchronously by the integral first ring gear, which is mechanically driven by the plurality of latch actuators 97. In a first embodiment, the plurality of latch actuators 97 is comprised of at least one primary latch actuator and at least one secondary latch actuator. In a second embodiment, the plurality of latch actuators 97 is electric motor drive actuators. Each latch linkage is driven over center at each end of travel. Additionally, in a third embodiment, the latch assembly 95 is further comprised of a second ring gear 104 and the plurality of latch subassemblies 102 is further comprised of a plurality of secondary linkages wherein the plurality of latch actuators 97 provide unlatching through the release of the plurality of secondary linkages by a means that is independent of the plurality of primary linkages. In a fourth embodiment, the latch assembly 95 is further comprised of one or more limit switches. In a fifth embodiment, the one or more limit switches are electromechanical limit switches for electrical indication/status of various latch configurations. Operationally, the one more limit switches provides information relative to a connection or disconnection between latch assemblies of opposing mating systems. Examples of various latch configurations include but are not limited to: "Latch system ready-to-latch position," "Primary unlatched position," "Primary latched position," "Secondary unlatched position," "Secondary latched position." In an embodiment, manual actuation is also provided for both primary and secondary operations by one or more manual drives or more specifically by the manual drive input shaft into the drive gearbox of the primary and secondary latch actuators. In the previous embodiment, the one or more manual drives are accessible from inside the space vehicle's pressurized volume through a removable cap 65 on the tunnel bottom ring 11. In the previous embodiment, the structural latch assembly 95 design provides for reset and reuse of the manual release system.

In addition, in an embodiment, the structural latch assembly 95 is further comprised of a pyrotechnic release assembly 103, which is available for an additional means of latch release but is not resettable after use. In the previous embodiment, the plurality of secondary interconnected linkages is retained by a pin-release mechanism, which can be released by firing the pyrotechnic release assembly. In a first embodiment, the pyrotechnical release assembly is comprised of a plurality of tubes represented by a tubing distribution assembly wherein the tubing distribution assembly is attached to the structural latch assembly 95, a plurality of compressed gas bottles connected to the tubing distribution assembly, a plurality of valves connected to the plurality of compressed gas bottles, and a plurality of toggles. In the previous embodiment, the plurality of valves is a tubing distribution assembly connected to the structural latch assembly 95 or more specifically to the plurality of latch subassemblies. Further, each latch subassembly 102 contains a pressure actuated pin-release mechanism to release a link in the plurality of linkages. Still further, the pin-release mechanism design uses a pin retained from release in a chamber by a plurality of collets. Upon pressurization the plurality of collets is removed from retaining the pinhead to release the pin. In a second embodiment, the pyrotechnic release assembly 103 is further comprised of one or more sensors (not otherwise shown). In a third embodiment, the one more sensors are strain gauges.

2.12 Mating Umbilical

Figure 9A:
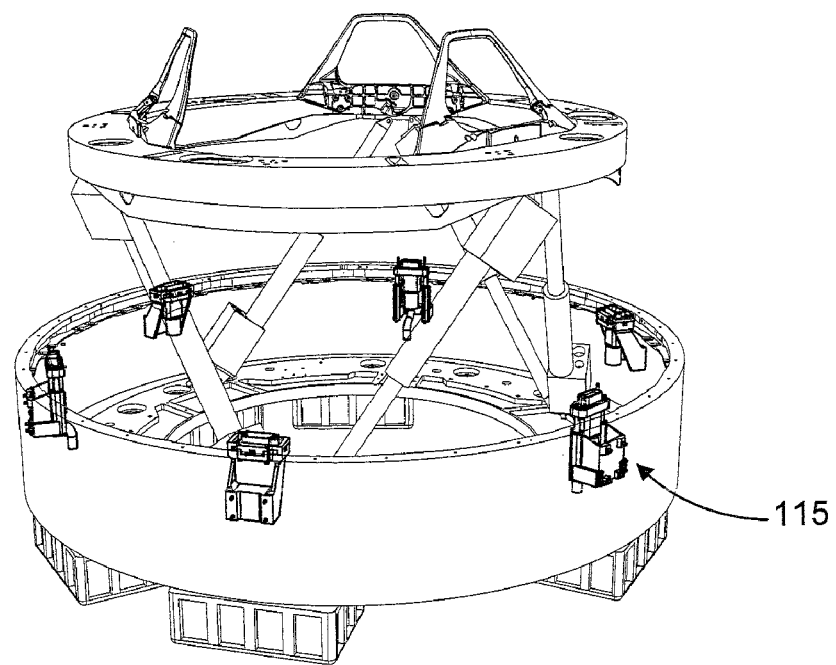
FIG. 9A is a perspective view of an embodiment of the 6-DOF platform in an extended position with particular emphasis on the plurality of mating umbilical assemblies.
Figure 9B:
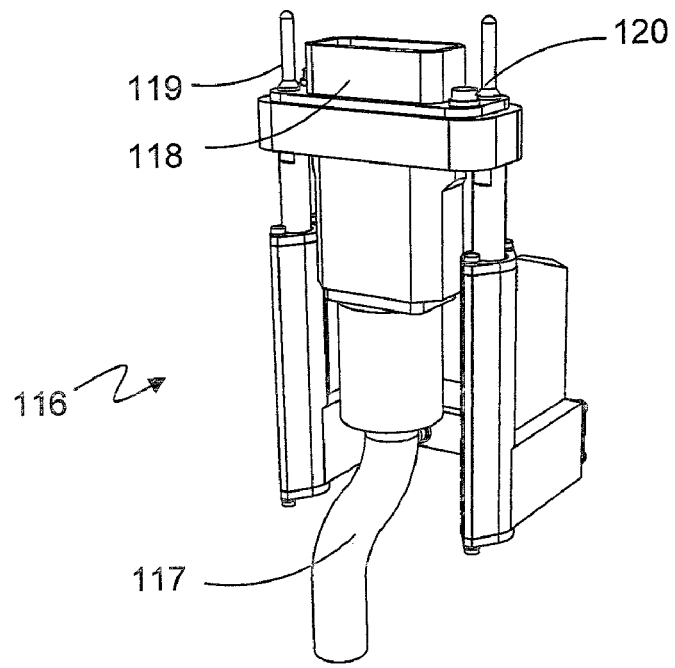
FIG. 9B is a perspective view of an embodiment of a mating umbilical.

With particular reference to FIGS. 9A and 9B, in an embodiment, a umbilical interface 115 is comprised of a plurality of compliant assembly 116 and a plurality of cable harnesses 117, wherein the compliant assembly 116 is coupled on the tunnel 12 to pass power and data from the mated vehicles. The umbilical mating process occurs during tunnel retracting and latching. This umbilical mating process is mechanically automatic (i.e., no external electrical power required). In another embodiment, the mating umbilicals provide the pass through conduits for power and data necessary for vehicle-to-vehicle connectivity.

In a first embodiment, the mating umbilicals are comprised of electrical connectors 118 that are provided to connect the conduits to a predetermined mated vehicle. In a second embodiment, the mating umbilical configuration is comprised of a predetermined number of alternating male and females connectors (not otherwise shown) to provide a predetermined number of mated connections at any given time. In a third embodiment, one half of the mated connectors provide mechanical compliance and guiding feature 119 needed for alignment during mating operations and during separation. In a fourth embodiment, an additional mechanical stroke is provided in the retract direction as a safety feature to preclude pin or connector damage from preventing full system mating. For the purposes of this section, a mechanical stroke is a utility and not a main function of the mating assembly. More specifically, when two mating assemblies are in its latching phase, an umbilical could prevent a proper latching if the umbilical is a rigid design. Thus, the mechanical stroke referred to supra may be interpreted as a breakaway design, such that an umbilical connection will be sacrificed for a proper mating of two mating assemblies. Also an additional mechanical stroke is provided as an extension during the separation phase to offer electrical connectivity until the structural latch assembly is completely released. The detailed electrical/pin use in the umbilical connections is to be determined by the host vehicle's implementation requirements.

In an embodiment, the plurality of mating umbilicals is comprised of a predetermined number of separate connections. In another embodiment, the predetermined number of separate connections is six. In the previous embodiment, three connections are comprised of a rigidly mounted receptacle. The other three connections are comprised of a compliant plug and provide automatic mechanical mating during tunnel retracting and structural latching. Thus, in the previous embodiment, when two vehicles are mated, six separate independent electrical paths are made. In an embodiment, the compliant plug is a MIL-C-83733 connector (DPKA, 51 pins, #20). In an embodiment, the receptacle is a Glenair split backshell (501-001).

In a first embodiment, the mating umbilical assembly preserves overall androgyny and 120 degrees rotation. In a second embodiment, the mating umbilical assembly never prevents the tunnel from completely retracting and latching. In a third embodiment, the mating umbilical assembly remains fully engaged during the separation phase for at least 0.5 inches (per latch release), for signal integrity. In a fourth embodiment, a guiding feature 119 is mounted on the tunnel (i.e., on the first vehicle's mating system) as to mate with a corresponding receptacle 120, which is mounted on another androgynous tunnel (i.e., on the second vehicle's mating system). In a fifth embodiment, an umbilical cable harness 117 (goes between the umbilical and the bulkhead which goes through the pass through) shall pass to the tunnel bottom ring electrical connector pass through.

2.13 Separation Push-Off Assembly

Figure 10A:
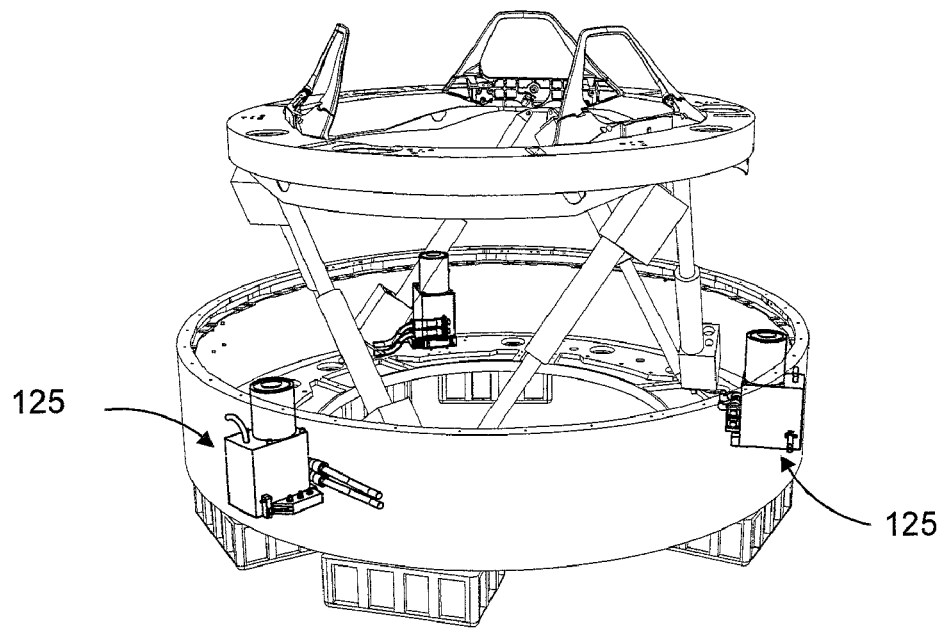
FIG. 10A is a perspective view of an embodiment of the 6-DOF platform in an extended position with particular emphasis on the plurality of separation push-off assemblies.
Figure 10B:
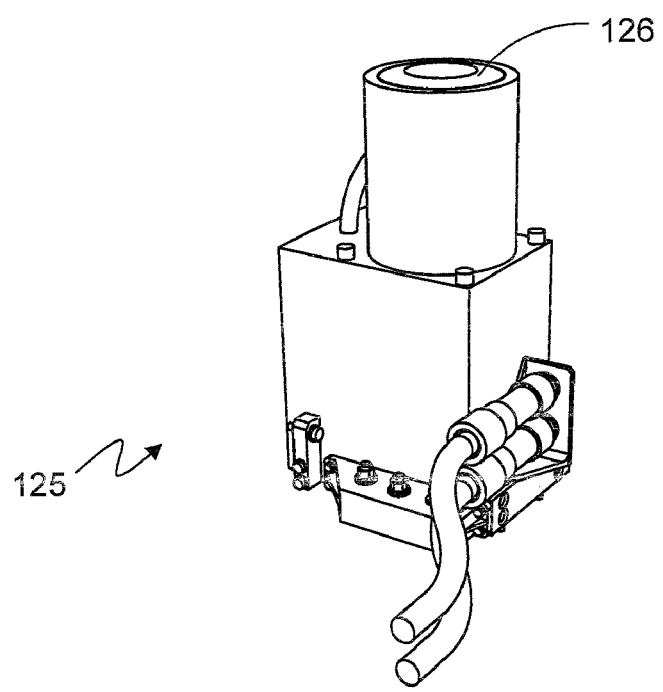
FIG. 10B is a perspective view of an embodiment of a separation push-off assembly.

With particular reference to FIGS. 10A and 10B, in an embodiment, a separation push-off assembly 125 is comprised of at least one spring-loaded push rods 126 to effect separation wherein at least one separation push-off assembly 125 is provided on a lower internal tunnel flange and pre-loaded against the face of the separation push-off assembly on the opposing mating interface. In operation, after the structural latch assembly 95 is in its latched position, the separation push-off assembly 125 is energized to "wind up" the at least one spring-loaded push rods 126 to provide the mating assembly interface preload that is released upon the structural latch assembly 95 release. The stored energy produced from the energized phase can be used to provide a separation delta velocity from the mated vehicle(s). In an embodiment, the separation push-off assembly 125 is energized after structural latching is complete and is reset-able after use with both nominal motor operations and with a manual input mechanism. In an embodiment, the separation push-off assembly 125 can also be de-energized (unwound) before a nominal un-berthing. Or, in another embodiment, the separation push-off assembly 125 can be used to separate mating interfaces during un-berthing for a controlled release of mating surfaces without having to rely on remote manipulator system (RMS) operations to do so.

3. Method of Use

Referring now to all figures, but with specific emphasis on FIGS. 11A, 11B, 11C, and 11D, the following discussion describes an example of the use of a first and second mating system with the purpose of mating two vehicles together. For illustration, and without limiting the scope of the present apparatus, the vehicle to be docked is assumed to be a vehicle similar to the Space Transportation System (i.e., the Space Shuttle), hereinafter referred to as the "mating" vehicle. For further illustration, and again without limiting the scope of the present apparatus, the vehicle to which the mating vehicle attaches to is a space station, hereinafter referred to as the "principal" vehicle. For illustration of an embodiment of the mating system of the present apparatus, first mating assembly 121 on a principal vehicle is "passive" and second mating assembly 122 on a mating vehicle is "active." However, this embodiment is inherently redundant because either mating assembly 121, 122 is capable of providing the "active" role when docking or berthing.

The mating vehicle must be maneuvered (either via a pilot or autonomously by remote control or by a RMS) into the capture envelope. Once inside the capture envelope, the second mating assembly's load ring 19, by extension or retraction, can achieve soft capture with positive, zero, or negative closing velocities.

Upon entering the capture envelope there are five modes of operation, which has been discussed supra, that include capture, attenuation, stabilization, retraction, and structural latching.

During the first four docking modes (i.e., capture, attenuation, stabilization, and retraction), the plurality of load cells 23 on the second mating assembly 122 senses forces and moments applied to the load ring 19. The load cells 23 are aided in their operation by the load joints 24, which minimize the effects of free-play and friction to allow the load cells 23 to be properly positioned for maximum sensitivity and accurate readings. Further, the overload protection assemblies 53 protect the load cells 23 in the event of excessive loads. The forces and moments described above are then used in kinematical calculations by the control system 13 of the second mating assembly 122. The results of the kinematical calculations are then outputted as position and orientation control signals by the control system 13 to the plurality of actuators 17 on the second mating assembly 122 to dynamically adjust the load ring 19 on the second mating assembly 122. The actuator joints 28 aid the actuators 17 in their operation by providing a means for efficient retracting and extending and transference of loads such that competing loads are balanced.

During the capture mode, electrical current is passed to energize/activate the one or more electromagnets for soft capture. After entering the capture envelope and beginning with initial contact, the plurality of alignment guides 18 on the active and passive mating assemblies 122, 121, respectively dynamically guide the load ring 19 on the active mating vehicle into alignment with the first mating assembly 121 on the principal vehicle. In addition, the one or more electromagnets 15 positioned on the outer face 26 of the load ring 19 on the second mating assembly 122 are delivered to corresponding one or more striker plates 16 positioned on the outer face 26 of the load ring 19 on the first mating assembly 121 of the other vehicle. In this example, a striker plate 16 is comprised of a 5-DOF compliant mechanism 41. The 5-DOF compliant mechanism 41 provides a means for maintaining minimum contact requirements between an electromagnet 15 and a striker plate 16. The one or more electromagnet limit switches 34 measures striker plate contact "on" or "off." When all of the one or more electromagnets 15 and all of the one or more striker plates 16 of the respective mating assemblies contact as confirmed by the one or more electromagnet limit switches 34, the operational mode of the second mating assembly 122 of mating vehicle from a capture mode to an attenuation mode.

During the attenuation mode, the residual motion is damped out and the forces are attenuated, the second mating assembly 122, under the direction of the control system 13, transitions first into stabilization and then into retraction modes.

During the stabilization and retraction modes, the mating vehicle and principal vehicle must be aligned such that a pressure tunnel can be created, sealed, and activated. In many instances however, when the stabilization and retraction mode is begun, the two vehicles are still misaligned. Thus, the control system 13 directs each individual actuator in the plurality of actuators 17 to physically (that is, extend or retract so as to) adjust the load ring 19 to achieve proper alignment of the mating and principal vehicles for sealing and latching. After proper alignment, the structural latch assembly 95 is engaged and effects a semi-permanent (rigid) structural connection between the mating and principal vehicles. Engagement of the structural latch assembly 95 compresses and pre-loads pressurization seals to maintain a pressurized transfer volume. The tunnel 12 creates a pressurized transfer tunnel through which persons, materials, etc. can pass. After achieving this semi-permanent structural connection, the electrical current is cut off from the one or more electromagnets 15 and the load ring 19 on the second mating assembly 122 and the one or more electromagnets 15 are disengaged from the first mating assembly 121 and retracted to a stowed position.

Separation of mating vehicle and principal vehicle occurs by releasing the structural latch assembly 95. Depending on the requirements of each de-mating operation, the separation push-off assemblies can provide zero force, a specified force, or full scale force to accomplish the separation of mated vehicles.

Having described the apparatus and methods for use above, various modifications of the techniques, procedures, materials, and equipment will be apparent to those skilled in the art. It is intended that all such variations within the scope and spirit of the apparatus and methods for use be included within the scope of the appended claims.

What is claimed is:

1. An androgynous mating system for mating two space modules, comprising:
   a first mating assembly capable of mating with a second mating assembly;
   a second mating assembly structurally identical to said first mating assembly, said first mating assembly comprising;
   a load ring having an annular outer face and inner face;
   a plurality of load cell subassemblies coupled to said load ring, wherein a load cell subassembly is comprised of at least one load joint and at least one load cell, each of said at least one load cell being capable of sensing forces imposed on said load ring by contact with said second mating assembly and generating electronic signals representative of the sensed forces;
   a plurality of actuators coupled to said load ring on a first side of said actuators and capable of physically and dynamically moving said load ring through six degrees of freedom;
   a base ring coupled to a second side of said actuators;
   a tunnel coupled to said base ring;
   a closed loop control system electronically connected to said plurality of load cell subassemblies and capable of analyzing the signals originating from said at least one load cell and of generating real time control signals wherein said plurality of actuators move said load ring through six degrees of freedom;
   one or more electromagnets positioned on said outer face of said load ring; and
   one or more striker plates positioned on said outer face of said load ring,
   wherein said one or more electromagnets on said second mating assembly are capable of mating with said one or more striker plates on said first mating assembly, and
   wherein said one or more striker plates is comprised of a plate of predetermined shape and a 5-DOF mechanism capable of maintaining predetermined contact requirements during said mating of said one or more electromagnets and said one or more striker plates.

2. The mating system of claim 1, further comprising:
   a plurality of hardstop structural columns coupled to said base ring, wherein said one or more striker plates is further comprised of a normal direction stroke capable of providing a sixth degree of freedom that is extendable and retractable, and wherein said plurality of hardstop structural columns on said first mating assembly is capable of pushing up a predetermined normal direction stroke on said first mating assembly such that the one or more electromagnets on said first mating assembly will not contact the one or more striker plates on said second mating assembly.

3. The mating system of claim 2, wherein said plurality of hardstop structural columns is comprised of a structural column, a hardstop mounting plate formed to one end of said structural column, wherein said hardstop mounting plate is coupled to said base ring, a hardstop contact coupled to said structural column at the second end of said structural column, and a load limiting device coupled between said hardstop contact and said structural column.

4. The mating system of claim 1, wherein said one or more electromagnets is comprised of one or more electromagnetic limit switches incorporated in each of said one or more electromagnets, wherein said each of said one or more electromagnetic limit switches is comprised of one or more microlimit switches and a protective mechanism, wherein said protective mechanism is comprised of:
 a protective housing coupled to said one or more microlimit switch;
 a pivot arm coupled to said protective housing; and
 a spring coupled to said pivot arm and protective housing.

5. The mating system of claim 1, wherein said at least one load joint is capable of providing 5 degrees of freedom for said at least one load cell.

6. The mating system of claim 5, wherein said at least one load joint is comprised of a predetermined sensing end, a predetermined ground end, wherein the at least one load joint is capable of providing 3 rotational degrees of freedom at said sensing end and 2 rotational degrees of freedom at said ground end.

7. The mating system of claim 1, further comprising a plurality of actuator joints wherein one of said actuator joints is coupled between said load ring and at least one of said plurality of actuators at a first end, and wherein another of said actuator joints is coupled between said base ring and said at least one of said plurality of actuators at a second end.

8. The mating system of claim 1, further comprising a plurality of lockdown assemblies coupled to said base ring, wherein said lockdown assembly is capable of providing capture and retention of said load ring in a passive mode and for launch load environment protection.

9. The mating system of claim 8, wherein each lockdown assembly is comprised of:
 a lockdown assembly housing;
 at least one lockdown actuator coupled to said lockdown assembly housing;
 a plurality of capture arms coupled to said lockdown assembly housing;
 a jackscrew electromechanically driven by said at least one lockdown actuator and coupled to said plurality of capture arms;
 a spring stack coupled to said jackscrew wherein said spring stack is capable of providing a uniform load to said plurality of capture arms;
 a slider coupled to said jackscrew and said spring stack wherein said slider serves as a structural interface capable of aiding in providing said uniform load; and
 at least one limit switch electromechanically connected to said plurality of lockdown capture arms and coupled to said lockdown assembly housing.

10. The mating system of claim 1, wherein said plurality of load cell subassemblies is further comprised of at least one overload protection assembly comprising:
 a structural arm; and
 a plurality of overload limiters coupled to said structural arm, wherein said overload limiters provide overload protection for said at least one load cell.

11. The mating system of claim 1, wherein said tunnel is comprised of:
 an inward facing tunnel channel; and
 a bottom ring coupled to said tunnel channel, wherein said bottom ring is comprised of multiple penetrations capable of mounting ancillary components and pass-thru connectors coupled to a predetermined number of said penetrations.

12. The mating system of claim 11, wherein said tunnel is further comprised of pass-thru auxiliary drives coupled to a predetermined number of said penetrations.

13. The mating system of claim 1, further comprising a structural latch assembly coupled to said tunnel capable of providing a final load reactive connection between said first and second mating assemblies.

14. The mating system of claim 13, wherein said structural latch assembly is comprised of:
 a first ring gear coupled to said tunnel;
 a second ring gear coupled to said tunnel;
 a plurality of latch actuators mechanically attached to said first ring gear, said second ring gear, or both;
 a plurality of linkages mechanically attached to said first ring gear, said second ring gear, or both; and
 a plurality of gearheads mechanically attached to said plurality of linkages.

15. The mating system of claim 1, further comprising a mating umbilical assembly coupled to said tunnel and capable of passing utilities and data between said two space modules.

16. The mating system of claim 15, wherein said mating umbilical assembly is comprised of:
 a plurality of mating umbilicals coupled to said tunnel; and
 a plurality of cable harnesses coupled to said mating umbilicals.

17. The mating system of claim 1, further comprising a separation push-off assembly coupled to said tunnel and capable of effectuating a controlled separation of said first and second mating assemblies.

18. The mating system of claim 1, further comprising at least one alignment guide petal coupled to said load ring.

19. The mating system of claim 1, wherein the 5-DOF mechanism of the striker plate is comprised of:
 a structural support;
 a plurality of restoring springs coupled to said structural support;
 a plurality of spring plungers coupled to said structural support and to at least one of the plurality of restoring springs;
 a slider plate coupled to a predetermined subset of said plurality of restoring springs;
 a pivot joint coupled to said structural support; and
 a plate coupled to said pivot joint.

20. A method of docking a first and second androgynous mating assembly as described in claim 1, comprising the steps:
 extending a portion of first mating assembly into contact with second androgynous docking assembly;
 sensing a plurality of forces imposed on first mating assembly by contact with second mating assembly;

assessing the magnitude of each of the plurality of imposed forces;

determining, from the magnitude of the plurality of imposed forces, the relative position and angular orientation of the first mating assembly with respect to the second mating assembly;

computing dynamic control signals required to effect a desired relative position and angular orientation of the first mating assembly with respect to the second mating assembly; and applying, in response to the dynamic control signals, forces on the second mating assembly to move the first mating assembly into desired relative position and angular orientation.

21. The method of claim 20 whereby the step of applying forces on the second mating assembly comprises the further steps of counteracting and absorbing forces imposed on the first mating assembly by the second mating assembly, and attenuating residual forces between first and second mating assemblies to bring them into the desired relative position and orientation.

22. The method of claim 21 further comprising the step of attaching the first mating assembly to the second mating assembly by activating electromagnetic devices on the first androgynous mating assembly.

23. The method of claim 20 further comprising the step of attaching the first mating assembly to the second mating assembly by activating electromagnetic devices on the second androgynous mating assembly.

* * * * *